United States Patent
Kim et al.

(10) Patent No.: US 9,201,590 B2
(45) Date of Patent: Dec. 1, 2015

(54) METHOD AND ELECTRONIC DEVICE FOR GESTURE-BASED KEY INPUT

(75) Inventors: Sangki Kim, Seoul (KR); Soungmin Im, Seoul (KR); Sunjin Yu, Seoul (KR); Kyungyoung Lim, Seoul (KR); Yongwon Cho, Seoul (KR); Taehyeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 14/005,460

(22) PCT Filed: Mar. 16, 2011

(86) PCT No.: PCT/KR2011/001835
§ 371 (c)(1),
(2), (4) Date: Sep. 16, 2013

(87) PCT Pub. No.: WO2012/124844
PCT Pub. Date: Sep. 20, 2012

(65) Prior Publication Data
US 2014/0006997 A1    Jan. 2, 2014

(51) Int. Cl.
*G06F 3/0488* (2013.01)
*G06F 3/01* (2006.01)
*G06F 3/03* (2006.01)

(52) U.S. Cl.
CPC .............. *G06F 3/0488* (2013.01); *G06F 3/011* (2013.01); *G06F 3/0304* (2013.01); *G06F 3/04886* (2013.01)

(58) Field of Classification Search
CPC ........................... G06F 3/0488; G06F 3/04886
See application file for complete search history.

(56) References Cited

U.S. PATENT DOCUMENTS

| 8,773,351 B2 * | 7/2014 | Rekimoto ............... 345/156 |
| 2002/0021287 A1 * | 2/2002 | Tomasi et al. .............. 345/168 |
| 2005/0206730 A1 * | 9/2005 | Hagiwara ................ 348/169 |
| 2007/0097085 A1 * | 5/2007 | Iwatsuki .................. 345/173 |
| 2007/0159453 A1 | 7/2007 | Inoue |
| 2010/0141484 A1 * | 6/2010 | Griffin et al. ................ 341/22 |
| 2011/0102570 A1 * | 5/2011 | Wilf et al. .................. 348/77 |
| 2012/0030637 A1 * | 2/2012 | Dey et al. ................... 715/863 |
| 2013/0127729 A1 * | 5/2013 | Mosby et al. .............. 345/168 |

FOREIGN PATENT DOCUMENTS

| JP | 2005-208802 A | 8/2005 |
| JP | 2007-219966 A | 8/2007 |
| KR | 2003-0038732 A | 5/2003 |
| KR | 10-2007-0009207 A | 1/2007 |
| WO | WO 02/21502 A1 | 3/2002 |

* cited by examiner

*Primary Examiner* — Anil Bhargava
(74) *Attorney, Agent, or Firm* — Birch, Stewart, Kolasch & Birch, LLP

(57) ABSTRACT

The present invention relates to a method and electronic device for a gesture-based key input and, more particularly, to a method and electronic device for a gesture-based key input, wherein an input region corresponding to a virtual keyboard is set according to any one of a single-hand typing mode and a double-hand typing mode and a key input is obtained based on gesture for the set input region. A gesture-based key input method according to an embodiment of the present invention includes displaying a virtual keyboard, setting an input region, corresponding to the displayed virtual keyboard, according to a typing mode selected from among a single-hand typing mode and a double-hand typing mode, recognizing gesture for the input region, and obtaining a key input based on the recognized gesture.

22 Claims, 23 Drawing Sheets

Fig. 34
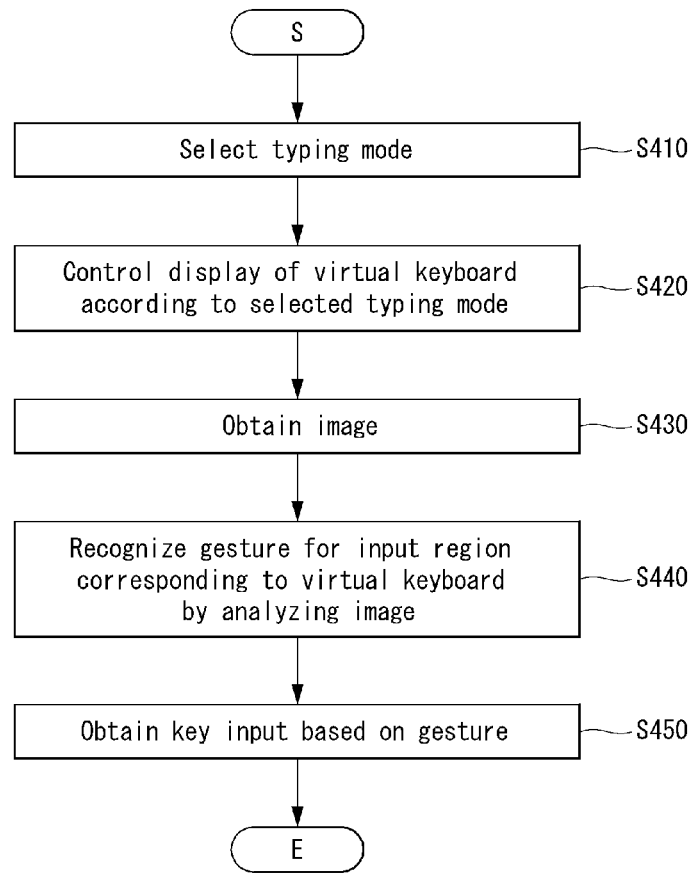
Fig. 35
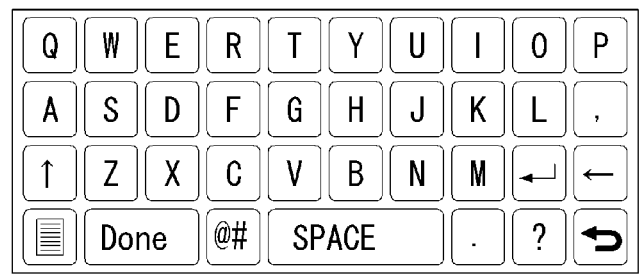
Fig. 36
| ABC | DEF | GHI |
|-----|-----|-----|
| JKL | MNO | PQR |
| STU | VWX | YZ. |
| ,;: | !?- | +*# |

(12) United States Patent
US 9,201,590 B2

METHOD AND ELECTRONIC DEVICE FOR GESTURE-BASED KEY INPUT

TECHNICAL FIELD

The present invention relates to a method and electronic device for a gesture-based key input and, more particularly, to a method and electronic device for a gesture-based key input, wherein an input region corresponding to a virtual keyboard is set according to any one of a single-hand typing mode and a double-hand typing mode and a key input is obtained based on gesture for the set input region.

BACKGROUND ART

Conventionally, an electronic device chiefly provides only one specific function, but has become able to provide a variety of functions with the gradual developments of technology. Accordingly, a user interface (UI) for enabling a user to easily use the electronic device having the various and complicated functions is gradually becoming important.

A gesture-based UI for manipulating an electronic device based on only a users gesture without an additional input device, such as a remote controller, is recently emerging as a core technological field. According to this tendency, active research is being done on the gesture-based UI for a key input which is basically necessary in order to utilize the various functions of an electronic device.

DISCLOSURE OF INVENTION

Technical Problem

Accordingly, the present invention has been made in view of the above problems, and it is an object of the present invention to provide a method and electronic device for a gesture-based key input, wherein an appropriate input region is provided according to a typing method of performing input through gesture, when key input is performed through gesture for an input region corresponding to a virtual keyboard.

It is another object of the present invention to provide a method and electronic device for a gesture-based key input, wherein only a necessary gesture of the hand is recognized according to a typing method of performing input through gesture, when a key input is performed through gesture for an input region corresponding to a virtual keyboard.

It is yet another object of the present invention to provide a method and electronic device for a gesture-based key input, wherein an indicator reflecting the position of the hand is appropriately indicated according to a typing method of performing input through gesture, when a key input is performed through gesture for an input region corresponding to a virtual keyboard.

It is still yet another object of the present invention to provide a method and electronic device for a gesture-based key input, wherein the display of a virtual keyboard is properly changed according to a typing method of performing input through gesture.

The technical objects to be achieved by the present invention are not limited to the above-described objects and other technical objects that have not been described above will become evident to those skilled in the art from the following description.

Solution to Problem

An electronic device according to an aspect of the present invention comprises a camera, a display configured to display a virtual keyboard, and a controller configured to set an input region, corresponding to the displayed virtual keyboard, according to a typing mode selected from among a single-hand typing mode and a double-hand typing mode, recognize gesture for the input region, detected through the camera, and obtain a key input according to the recognized gesture.

An electronic device according to another aspect of the present invention comprises a camera, a display configured to display a virtual keyboard, and a controller configured to obtain information about a state of the hand by analyzing an image obtained through the camera, select a typing mode based on the information about the state of the hand, set an input region corresponding to the displayed virtual keyboard according to the selected typing mode, recognize gesture for the input region detected through the camera, and obtain a key input according to the recognized gesture.

An electronic device according to yet another aspect of the present invention comprises a camera, a display configured to display a virtual keyboard, and a controller configured to set an input region corresponding to the displayed virtual keyboard, control an attribute of the input region according to a typing mode selected from among a single-hand typing mode and a double-hand typing mode, recognize gesture for the input region detected through the camera, and obtain a key input according to the recognized gesture.

An electronic device according to still yet another aspect of the present invention comprises a camera, a display configured to display a virtual keyboard, and a controller configured to, when a typing mode selected from among a single-hand typing mode and a double-hand typing mode is entered, recognize gesture for an input region on a 3-D space corresponding to the displayed virtual keyboard by analyzing an image obtained through the camera and obtain a key input based on the recognized gesture, when the single-hand typing mode is entered, obtain the key input by recognizing only gesture performed by a first hand from the image, and when the double-hand typing mode is entered, obtain the key input by recognizing gesture performed by at least one of the first hand and a second hand from the image.

An electronic device according to still yet another aspect of the present invention comprises a camera, a display configured to display a virtual keyboard, and a controller configured to, when a typing mode selected from among a single-hand typing mode and a double-hand typing mode is entered, recognize gesture for an input region on a 3-D space corresponding to the displayed virtual keyboard by analyzing an image obtained through the camera and obtain a key input based on the recognized gesture, when the single-hand typing mode is entered, obtain the key input by recognizing only gesture performed by a first hand from the image, and when the double-hand typing mode is entered, obtain the key input by recognizing gesture performed by at least one of the first hand and a second hand from the image. Here, the controller senses a position of a hand within the input region through the camera and displays an indicator at coordinates corresponding to the position of the hand on the virtual keyboard, and the controller displays one indicator, reflecting a position of one hand, when the single-hand typing mode is entered and displays two indicators, reflecting respective positions of both hands, when the double-hand typing mode is entered.

An electronic device according to still yet another aspect of the present invention comprises a camera, a display configured to display a virtual keyboard, and a controller configured to control a display of the virtual keyboard according to a typing mode selected from among a single-hand typing mode and a double-hand typing mode, recognize gesture for an input region corresponding to the virtual keyboard by analyzing an image obtained through the camera, and obtain a key input based on the recognized gesture.

A gesture-based key input method according to an aspect of the present invention comprises displaying a virtual keyboard, setting an input region on a 3-D space, corresponding to the displayed virtual keyboard, according to a typing mode selected from among a single-hand typing mode and a double-hand typing mode, recognizing gesture for the input region, and obtaining a key input based on the recognized gesture.

A gesture-based key input method according to another aspect of the present invention comprises displaying a virtual keyboard, obtaining information about a state of the hand by analyzing an image obtained through a camera, selecting any one of a single-hand typing mode and a double-hand typing mode based on the information about the state of the hand, setting an input region corresponding to the displayed virtual keyboard according to the selected typing mode, recognizing gesture for the input region, and obtaining a key input based on the recognized gesture.

A gesture-based key input method according to yet another aspect of the present invention comprises displaying a virtual keyboard, setting an input region corresponding to the displayed virtual keyboard according to a typing mode selected from among a single-hand typing mode and a double-hand typing mode, recognizing gesture for the input region, and obtaining a key input based on the recognized gesture. Here, setting the input region comprises controlling an attribute of the input region according to the selected typing mode.

A gesture-based key input method according to still yet another aspect of the present invention comprises displaying a virtual keyboard, when a typing mode selected from among a single-hand typing mode and a double-hand typing mode is entered, recognizing gesture for an input region corresponding to the displayed virtual keyboard by analyzing an image obtained through a camera, and obtaining a key input based on the recognized gesture. Here, recognizing the gesture comprises, when the single-hand typing mode is entered, recognizing only gesture performed by a first hand from the image and, when the double-hand typing mode is entered, recognizing gesture performed by at least one of the first hand and a second hand from the image.

A gesture-based key input method according to still yet another aspect of the present invention comprises displaying a virtual keyboard, controlling a display of the virtual keyboard according to a typing mode selected from among a single-hand typing mode and a double-hand typing mode, recognizing gesture for an input region corresponding to the virtual keyboard, and obtaining a key input based on the recognized gesture.

Advantageous Effects of Invention

According to the present invention, when a key input is performed through gesture for an input region corresponding to a virtual keyboard, an appropriate input region is provided according to a typing method of performing input through gesture. Accordingly, there is an advantage in that a user can accurately perform a key input without feeling fatigue.

According to the present invention, when a key input is performed through gesture for an input region corresponding to a virtual keyboard, only a necessary gesture of the hand is recognized according to a typing method of performing input through gesture. Accordingly, there are advantages in that a computational load for recognizing gesture can be reduced and gesture is not erroneously recognized according to the movement of the hand not used for input.

According to the present invention, when a key input is performed through gesture for an input region corresponding to a virtual keyboard, an indicator reflecting the position of the hand of a user is appropriately displayed according to a typing method of performing input through gesture. Accordingly, there is an advantage in that a user can easily perform gesture for an input region by checking the position of the hand.

The present invention has an advantage in that a user can perform a key input more conveniently by properly changing the display of a virtual keyboard according to a typing method of performing input through gesture.

BRIEF DESCRIPTION OF DRAWINGS

FIG. 34 is a flowchart illustrating a gesture-based key input method according to a fourth embodiment of the present invention;

FIG. 35 is a first diagram relating to the layout of a virtual keyboard in the gesture-based key input method according to the fourth embodiment of the present invention;

FIG. 36 is a second diagram relating to the layout of a virtual keyboard in the gesture-based key input method according to the fourth embodiment of the present invention.

DESCRIPTION OF REFERENCE NUMERALS OF PRINCIPAL ELEMENTS IN THE DRAWINGS

Figure 1:
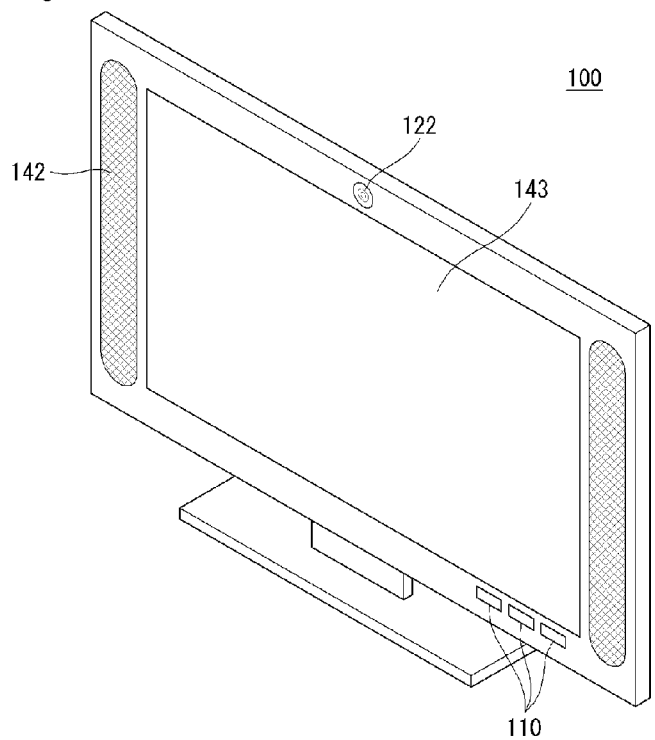
FIG. 1 is a perspective view relating to an embodiment of an electronic device according to the present invention.

100: electronic device 110: user input module
120: AV input module 121: audio input module
122: video input module 130: sense module
131: proximity sensor 132: illuminance sensor
140: output module 141: vibration module
142: audio output module 143: video output module
150: communication module 151: position location module
152: Internet module 153: near-field communication module
154: wired communication module 155: broadcast reception module
160: storage module 170: controller
180: power supply module C: camera
P: projector V: virtual keyboard
A: input region H: hand
H1: first hand H2: second hand
I: indicator I1: first indicator
I2: second indicator

MODE FOR THE INVENTION

Terms used in this specification are used to easily describe the present invention. Accordingly, the present invention is not limited to the terms used in this specification.

From among the terms used in this specification, a term, such as "connect" or "couple", does not necessarily mean direct connection or coupling, but is a concept including indirect connection or coupling through a medium. Furthermore, terms, such as a "module" ad a "unit", are used for convenience of description, and they do not have different meanings or functions in themselves.

The present invention may be modified or changed without departing from the spirit and scope of the present invention. The modifications or changes made without departing from the spirit and scope of the present invention are evident to a person having ordinary skill in the art to which the present invention pertains. Accordingly, the present invention includes modification examples or change examples without departing from the spirit and scope of the present invention. Furthermore, the present invention is not limited to the following embodiments.

An electronic device 100 described in this specification may include television, digital television (DTV), Internet protocol television (IPTV), a mobile phone, a smart phone, personal digital assistants (PDAs), a portable multimedia player (PMP), a personal computer (PC), a laptop computer, a tablet computer, a digital broadcast terminal, a mobile communication terminal, a navigator, and electronic devices which are evident to a person having ordinary skill in the art to which the present invention pertains.

The present invention will now be described with reference to the accompanying drawings. The drawings are shown to help understanding of the present invention, and the technical spirit of the present invention is not limited to the accompanying drawings. Meanwhile, the same reference numerals are used to identify the same elements in the drawings, and a redundant description may be omitted for simplicity.

The electronic device 100 according to the present invention is described below with reference to FIGS. 1 and 2. FIG. 1 is a perspective view relating to an embodiment of the electronic device 100 according to the present invention, and FIG. 2 is a block diagram of the electronic device 100 according to the present invention.

The electronic device 100 can recognize gesture and obtain a key input based on the recognized gesture. The electronic device 100 can display a virtual keyboard, set an input region corresponding to the displayed virtual keyboard, recognize gesture for the set input region, and obtain a key input based on the recognized gesture.

Figure 2:
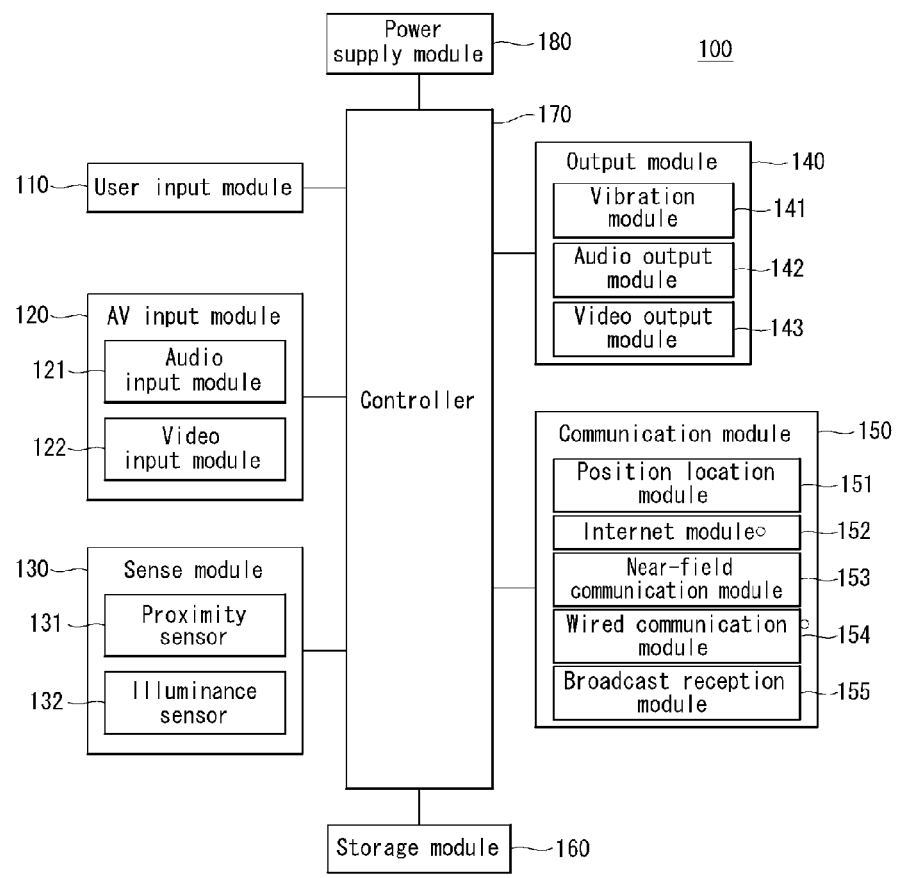
FIG. 2 is a block diagram of the electronic device according to the present invention.

The electronic device 100, as shown in FIGS. 1 and 2, may comprise at least one of a user input module 110 for receiving input from a user, an audio/video (AV) input module 120 for obtaining audio information and video information, a sense module 130 for sensing various states, an output module 140 for outputting information, a communication module 150 for performing communication, a storage module 160 for storing information, a controller 170 for controlling the entire operation of the electronic device 100, and a power supply module 180 for supplying power to the electronic device 100.

In the electronic device 100 according to the present invention, the above elements are not indispensable, and the electronic device 100 needs not to comprise all the above elements. In other words, the electronic device 100 according to the present invention may selectively comprise the above elements.

The elements of the electronic device 100 are described below with reference to FIG. 2 in order of the user input module 110, the AV input module 120, the sense module 130, the output module 140, the communication module 150, the storage module 160, the controller 170, and the power supply module 180.

The user input module 110 can receive input from a user. A user may directly manipulate the operation of the electronic device 100 using the user input module 110. The user input module 110 may include at least one of a keypad, a dome switch, a jog wheel, a jog switch, a touch pad, and other input devices which are evident to a person having ordinary skill in the art to which the present invention pertains.

The AV input module 120 can obtain at least one of audio information and video information. The AV input module 120 may include at least one of an audio input module 121 for obtaining audio information and a video input module 122 for obtaining video information.

The audio input module 121 can obtain audio information. For example, the audio input module 121 may be implemented using a microphone and configured to receive an external audio signal and obtain audio information by electrically processing the received audio signal. For another example, the audio input module 121 may be implemented using an interface for receiving an external audio signal, such as a broadcast signal, and configured to obtain audio information.

Meanwhile, the audio input module 121 may perform a noise cancellation algorithm for canceling noise generated in a process of receiving an external audio signal.

The audio information obtained by the audio input module 121 as described above may be outputted through the output module 140, such as a speaker, externally transmitted through the communication module 150, or stored in the storage module 160.

The video input module 122 can obtain video information. The video information obtained by the video input module 122 may be outputted through the output module 140, such as a display, externally transmitted through the communication module 150, or stored in the storage module 160.

The video input module 122 may be implemented using a camera or an interface for receiving an external image signal.

The camera can obtain video information, such as a still image or a moving image, in response to an optical signal. Here, the optical signal may include not only a visible ray, but also infrared rays or ultraviolet rays that are not seen by the naked eye.

The camera may be implemented using at least one of a 2-D (2-D) camera and a 3-D (3-D) camera.

The 2-D camera can receive external light, obtain brightness information or color information based on the received light, and obtain a 2-D image based on the brightness information or color information. For example, the 2-D camera may obtain video information based on light received through an image sensor which is implemented using a charge coupled device (CCD) or a complementary metal oxide semiconductor (CMOS) device.

The 3-D camera can receive external light, obtain depth information based on the received light, and obtain a 3-D image, such as a depth image reflecting the depth information.

The 3-D camera can radiate light to a subject, receive light reflected and returned from the subject, and obtain depth information about distance from the subject in real time based on the received light using a depth sensor. Furthermore, the 3-D camera can obtain an intensity image according to the intensity or strength of light returned together with a depth image. The intensity image is an image, reflecting not only distance from an object, but also information according to states, such as the color, temperature, and brightness of the object. The intensity image can be more easily identified by a user than a depth image.

The 3-D camera may include at least one of a stereo camera, a time of flight (TOF) camera, a structured light camera, and other image obtaining devices which are evident to a person having ordinary skill in the art to which the present invention pertains.

The TOF camera is a camera for obtaining depth information based on a TOF principle. The TOF camera can radiate infrared rays or a laser having a short pulse using a light emitting diode (LED), receive returned light, calculate a difference between the radiated light and light returned and received through a TOF sensor, and obtain depth information by sensing distance from a subject. Here, the TOF camera may calculate returned time on the basis of a phase difference between the radiated light and the received light.

A method of directly obtaining depth information through the 3-D camera is advantageous in that a complicated operation is not required and error is small, as compared with an indirect method of obtaining depth information using computer vision technology from a plurality of 2-D images.

The sense module 130 can sense various states. The sense module 130 may include a proximity sensor 131 and an illuminance sensor 132.

The proximity sensor 131 can detect an object approaching a specific detection surface or whether an object exists nearby. The proximity sensor 131 can detect whether an object exists using electrical and optical signals for a detection surface. The proximity sensor 131 may have a longer lifespan and greater utilization than a contact sensor because it is not dependent on mechanical contact.

The proximity sensor 131 may include a transmission type photoelectric sensor, a direct reflection type photoelectric sensor, a mirror reflection type photoelectric sensor, a high frequency oscillation type proximity sensor, a capacitance type proximity sensor, a magnetic type proximity sensor, and an infrared proximity sensor.

The illuminance sensor 132 can measure illuminance around the electronic device 100. The electronic device 100 may control surrounding brightness of a display according to illuminance measured by the illuminance sensor 132.

The output module 140 can output information. The electronic device 100 can provide a user with various pieces of information through the output module 140.

The output module 140 can output information in the form of at least one of a tactile signal, an aural signal, and a visual signal. The output module 140 may include at least one of a display, a speaker, a vibrator, and other output devices which are evident to a person having ordinary skill in the art to which the present invention pertains.

The output module 140 may include at least one of a vibration module 141, an audio output module 142, and a video output module 143.

The vibration module 141 can output a tactile signal. The vibration module 141 can generate vibration felt by a user. In this case, the vibration module 141 can generate various pieces of vibration by controlling the intensity and pattern of vibration.

The vibration module 141 can generate a tactile signal according to the movement of a pin array vertically moving against a contact skin surface, a tactile signal according to the jet power or suction power of air via an outlet or an inlet, a tactile signal on a skin surface, a tactile signal according to a contact of an electrode, a tactile signal using electrostatic power, a tactile signal according to hot/cold sense reproduction using an endothermic or exothermic device as well as the vibration, as well as vibration.

The vibration module 141 may generate not only a tactile signal transferred through a direct contact, but also a tactile signal transferred via muscular sense of a finger or an arm of a user.

The audio output module 142 can output an aural signal (that is, an audio signal). For example, the audio output module 142 may output an audio signal based on audio information which is received from the communication module 150 or stored in the storage module 160. For another example, the audio output module 142 may output audio signals pertinent to various functions performed by the electronic device 100.

The audio output module 142 may be implemented using a receiver, a speaker, or a buzzer. For example, the audio output module 142 may output audio through earphones connected to an earphone jack.

The video output module 143 can output a visual signal. The video output module 143 can display video information. For example, the video output module 143 may display a user UI or a graphic user interface (GUI).

The video output module 143 may be implemented using at least one of a liquid crystal display (LCD), a thin film transistor liquid crystal display (TFT LCD), an organic light-emitting diode (OLED) display, a flexible display, a 3-D display, and other displays which are evident to a person having ordinary skill in the art to which the present invention pertains.

The display may be a transparent or light-transmitting display made of a material that transmits light. A representative example of the transparent display that transmits light includes a transparent LCD. The back structure of the transparent display may also have a light-transmitting structure. A user can see things placed in the rear of the electronic device 100 through the transparent display.

The video output module 143 needs not to be implemented using a single display, but may be implemented using a plurality of displays. For example, the video output module 143 may be implemented using displays which are spaced apart from each other or integrally disposed on one face or displays which are disposed in different faces.

Furthermore, the video output module 143 needs not to be implemented using a display, but may be implemented using a projector for providing an image by scanning light on a screen or providing a hologram 3-D image.

Meanwhile, the output module 140 and the user input module 110 may be integrally implemented using one device.

For example, the output module 140 and the user input module 110 may be implemented using a touch screen for displaying information and simultaneously receiving touch input. The touch screen may include a display for displaying information and a touch panel for sensing touch input, which are disposed to form a layer. Here, the touch panel can detect at least one of the position on which touch input is performed, a touched area, and the strength of the touch by detecting the touch input.

The touch panel may be classified into various kinds according to methods of sensing the touch input. The types of the touch panel may include a resistive type (decompression type) touch panel, an ultrasonic reflective type touch panel, a capacitive type touch panel, and an infrared optical type touch panel.

The resistive type touch panel may be provided by disposing two substrates on which an ITO metal layer is coated between dot spacers so that they face each other. In the resistive type touch panel, touch input according to a contact can be detected through an upper substrate, and a touched position can be detected through a lower substrate.

The capacitive type touch panel may be implemented using a substrate configured to have special conductive metal (for example, tin antimony oxide (TAO)) coated thereon and operated as a transparent electrode so that a certain amount of current flows on the surface of the substrate. When a user performs touch input on the capacitive type touch panel, current flowing on the surface of the substrate is changed by capacitance in the body of the user. The capacitive type touch panel can detect a touched position by detecting a change in the amount of current.

According to the above-described principle, the touch screen can display information and simultaneously receive touch input.

The communication module 150 can perform communication. The communication module 150 can send and receive information by performing communication with an external device.

The communication module 150 may include at least one of a position location module 151, a wireless Internet module 152, a near-field communication module 153, a wired communication module 154, and a broadcast transmission and reception module 155.

The position location module 151 can obtain position information.

The position location module 151 may obtain position information using a global navigation satellite system (GNSS). The GNSS is a system configured to include navigation satellites revolving around the earth and a navigation receiver for receiving satellite electric waves from the navigation satellites and calculating position information about their specific locations on the surface of the earth or near the surface of the earth and to obtain position information. The GNSS may include a global position system (GPS) operated by U.S.A, Galileo operated by Europe, a global orbiting navigational satellite system (GLONASS) operated by Russia, COMPASS operated by China, an Indian regional navigation satellite system (IRNS) operated by India, a quasi-zenith satellite system (QZSS) operated by Japan, and so on.

Accordingly, the position location module 151 may be, for example, a GPS module corresponding to each GNSS. The position location module 151 can receive satellite electric waves, including identification information and time information about three or more navigation satellites, from the navigation satellites. The position location module 151 can calculate distance from a specific location to each of the navigation satellites based on the identification information and time information of the navigation satellites and the time that the satellite electric waves take to reach the specific location. The position location module 151 can calculate 3-D position information about the specific location based on the calculated distance and time. The 3-D position information may be represented by latitude, longitude, and an altitude.

However, the position information does not need to directly reflect the position as if it is represented by coordinate values for a specific location. In a broad sense, the position information may include satellite electric waves which are transmitted by navigation satellites in the GNSS.

In the case where satellite electric waves transmitted by a larger number of navigation satellites are used, the position location module 151 may correct position information using excessive satellite electric waves.

Furthermore, the position location module 151 may calculate the moving speed according to a change in the position information according to time.

Meanwhile, the position location module 151 needs not to independently calculate all the pieces of position information, and some or all of the pieces of position information using satellite electric waves may be calculated by the controller 170 or an external device. For example, when the position location module 151 receives satellite electric waves from the GNSS and sends information, included in the satellite electric waves, to an external device through the communication module 150, the external device may generate position information based on the received information and send the generated position information back to the electronic device 100.

The position location module 151 may obtain position information using the GNSS and also obtain position information through triangular measurement using a communication signal by communicating with a mobile phone base station.

In some embodiments, the position location module 151 may obtain position information based on the position of an access point (AP) by communicating with the AP over a near-field communication network.

Meanwhile, the electronic device 100 may correct obtained position information. The position location module 151 or the controller 170 may correct the position information using a map matching scheme. The position location module 151 or the controller 170 may correct obtained position information by checking a place corresponding to the position information using map data stored in the storage module 160.

For example, when a place according to first calculated position information is a place that cannot enter, such as a river, the position location module 151 or the controller 170 may correct the position information using coordinates corresponding to a place that can enter and is close to the river.

The Internet module 152 is a device for accessing the Internet in a wired or wireless manner and transmitting and receiving information. The Internet module 152 can access the Internet and transmit and receive various pieces of information. The Internet module 152 may be internal or external to the electronic device 100 or may be attached to or detached from the electronic device 100.

The Internet module 152 can access the Internet in a wired or wireless manner and perform communication in accordance with at least one of local area network (LAN), wireless LAN (WLAN), Wibro wireless broadband, Wimax world interoperability for microwave access, high speed downlink packet access (HSDPA), and other various communication standards.

The near-field communication module 153 can perform near-field wireless communication.

The first near-field communication module 153 can perform communication in accordance with at least one of Bluetooth, radio frequency identification (RFID), infrared data association (IrDA), ultra wideband (UWB), ZigBee, and other near-field communication standards.

The near-field communication module 153 can communicate with various external devices placed at a short distance. For example, the near-field communication module 153 can perform communication with a remote controller for controlling the electronic device 100 at a long distance.

The wired communication module 154 can connect the electronic device 100 and an external device in a wired manner.

The wired communication module 154 can perform communication with an external device through various interfaces. For example, the wired communication module 154 may perform communication with an external device through at least one of interface devices, such as a USB module capable of performing communication through a universal serial bus (USB) port, a port of an RS-232 standard, a headset port, an external charger port, a data port, a memory card port, an audio input/output (I/O) port, a video input/output (I/O) port, and an earphone jack.

The broadcast reception module 155 can receive at least one of broadcast signals and broadcast associated information from an external broadcast server via a broadcast channel. The broadcast channel may include at least one of a satellite channel and a terrestrial channel. The broadcast server may be a server for generating and sending at least one of a broadcast signal and broadcast associated information or a server for receiving a previously generated broadcast signal and broadcast associated information and sending the broadcast signal and the broadcast associated information to the electronic device. At least one of the broadcast signal and the broadcast associated information, received through the broadcast reception module 155, may be stored in the storage module 160.

Here, the broadcast signal may include a TV broadcast signal, a radio broadcast signal, and a data broadcast signal and may also include a signal in the form of a combination of the TV broadcast signal, the radio broadcast signal, and the data broadcast signal.

The broadcast associated information may be information about a broadcasting channel, a broadcasting program, or a broadcasting service provider. The broadcast associated information may be provided even over an additional communication network.

The broadcast associated information may have various forms, such as an electronic program guide (EPG) of digital multimedia broadcasting (DMB) or an electronic service guide (ESG) of digital video broadcast-handheld (DVB-H).

The broadcast reception module 155 may receive broadcast signals through various broadcast systems. The broadcast systems may include digital multimedia broadcasting-terrestrial (DMB-T), digital multimedia broadcasting-satellite (DMB-S), media forward link only (MediaFLO), digital video broadcast-handheld (DVBH), and integrated services digital broadcast-terrestrial (ISDB-T), and various broadcast systems which are evident to a person having ordinary skill in the art to which the present invention pertains.

The construction of the communication module 150 and the communication method of the communication module 150 are not limited to the above-described examples. The communication module 150 may include at least one of the above-described communication module and other communication devices which are evident to a person having ordinary skill in the art to which the present invention pertains and may perform communication using at least one of various communication standards accordingly.

Furthermore, the communication module 150 needs not to perform communication with one external device through only a communication module and may perform communication with a plurality of external devices through a plurality of communication modules at the same time.

The storage module 160 can store information.

The storage module 160 may store information necessary for the operation of the electronic device 100 and information generated by the operation of the electronic device 100. The information necessary for the operation of the electronic device 100 may include, for example, an operating system (OS). The information generated by the operation of the electronic device 100 may include still images, moving images, volume information, and so on.

The storage module 160 may include a variety of storage media. For example, the storage module 160 may include at least one of flash memory, random access memory (RAM), static random access memory (SRAM), read only memory (ROM), electrically erasable programmable read only memory (EEPROM), a hard disk, magnetic memory, a magnetic disc, an optical disc such as CD or Blu-ray, card type memory such as an SD card, and other storage media which are evident to a person having ordinary skill in the art to which the present invention pertains.

The storage module 160 may be provided in a form in which it is placed within the electronic device 100, a form in which it is external to the electronic device 100, or a form in which it is attached to and detached from the electronic device 100. The storage module 160 of a form in which it is external to the electronic device 100 may include not only an external hard disk, but also web storage for performing the storage function of the storage module 160 on the Internet.

The controller 170 can control the entire operation of the electronic device 100 and the other elements of the electronic device 100. For example, the controller 170 may associate various pieces of information with each other and perform processing so that the information can be used.

The controller 170 may be implemented using a computer or a similar device using software, hardware, or a combination of the software and hardware.

According to hardware implementations, the controller 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and an electrical device for performing a control function which is evident to a person having ordinary skill in the art to which the present invention pertains.

According to software implementations, the controller 170 may be implemented using software codes or a software application which is written by one or more program languages. The software may be stored in the storage module 160 and executed by the hardware configuration of the controller 170. Furthermore, the software may be transmitted from an external device (for example, a server) to the electronic device 100 and then installed in the electronic device 100.

The controller 170 will be described in detail in connection with a description of a gesture-based key input method according to the present invention.

The power supply module 180 can supply power to the electronic device 100. The power supply module 180 can receive external power or internal power under the control of the controller 170 and supply power for the operation of each of the elements of the electronic device 100.

Hereinafter, the gesture-based key input method according to the present invention is described.

The gesture-based key input method according to the present invention is described with reference to the electronic device 100 according to the present invention.

The description of the gesture-based key input method according to the present invention with reference to the electronic device 100 according to the present invention is only for facilitating understanding of the description, and the gesture-based key input method according to the present invention is not limited to the electronic device 100 according to the present invention.

Accordingly, the gesture-based key input method according to the present invention may be performed using other electronic devices which perform the same functions as or similar functions to the electronic device 100 according to the present invention. Here, the other electronic devices may include television, digital television (DTV), Internet protocol television (IPTV), mobile phones, smart phones, personal digital assistants (PDA), portable multimedia players (PMP), personal computers (PC), laptop computers, tablet computers, digital broadcast terminals, mobile communication terminals, navigators, and other electronic devices which are evident to a person having ordinary skill in the art to which the present invention pertains.

Figure 3:
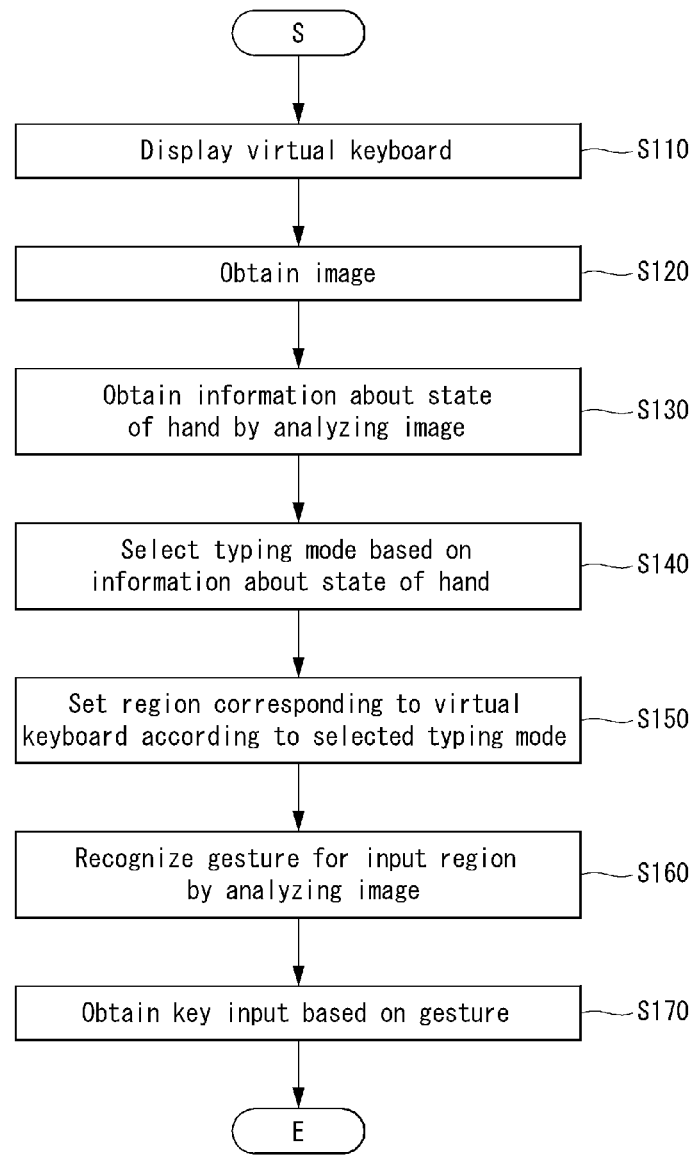
FIG. 3 is a flowchart illustrating a gesture-based key input method according to a first embodiment of the present invention.

A first embodiment of the gesture-based key input method according to the present invention is described below with reference to FIG. 3. FIG. 3 is a flowchart illustrating the gesture-based key input method according to the first embodiment of the present invention.

The gesture-based key input method according to the present invention, as shown in FIG. 3, may comprise at least one of displaying a virtual keyboard at step S110, obtaining an image at step S120, obtaining information about a state of the hand by analyzing the image at step S130, selecting a typing mode on the basis of the information about the state of the hand at step S140, setting an input region, corresponding to the virtual keyboard, according to the selected typing mode at step S150, recognizing gesture for the input region by analyzing the image at step S160, and obtaining a key input based on the gesture at step S170.

Each of the steps of the gesture-based key input method according to the first embodiment of the present invention is described below.

Figure 4:
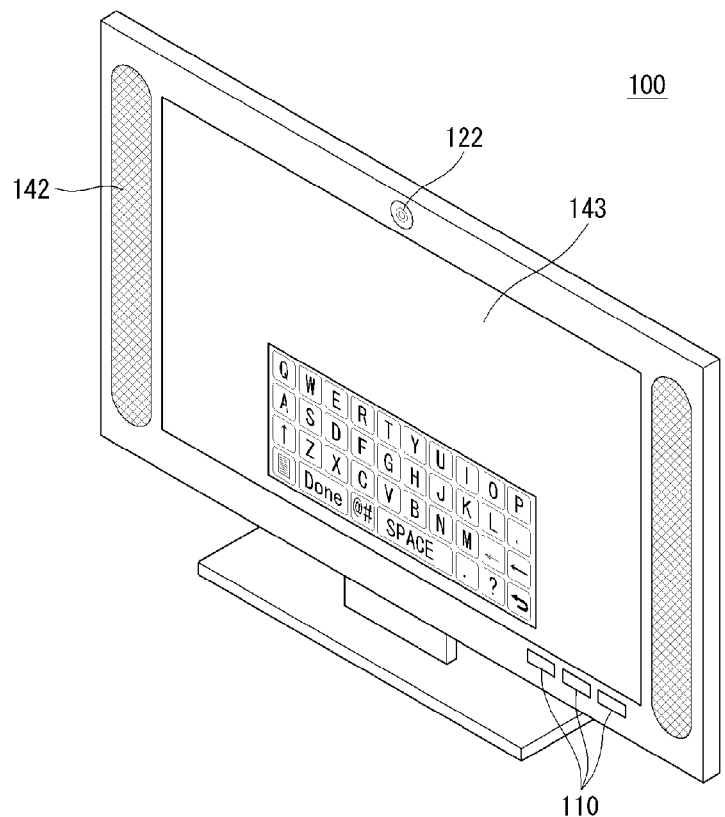
FIG. 4 is a diagram relating to a 2-D virtual keyboard in the gesture-based key input method according to the first embodiment of the present invention.
Figure 5:
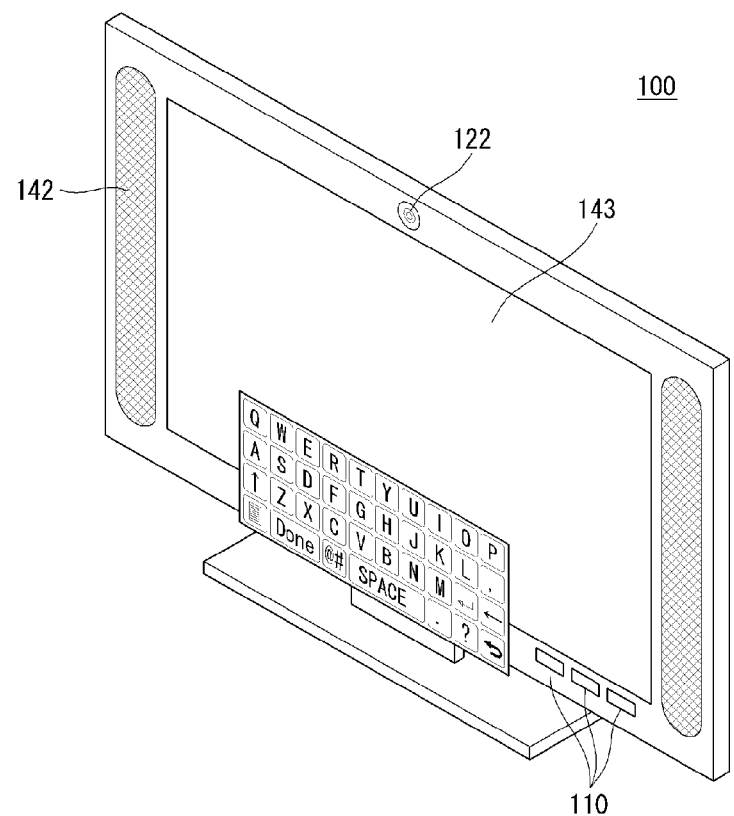
FIG. 5 is a diagram relating to a 3-D virtual keyboard in the gesture-based key input method according to the first embodiment of the present invention.
Figure 6:
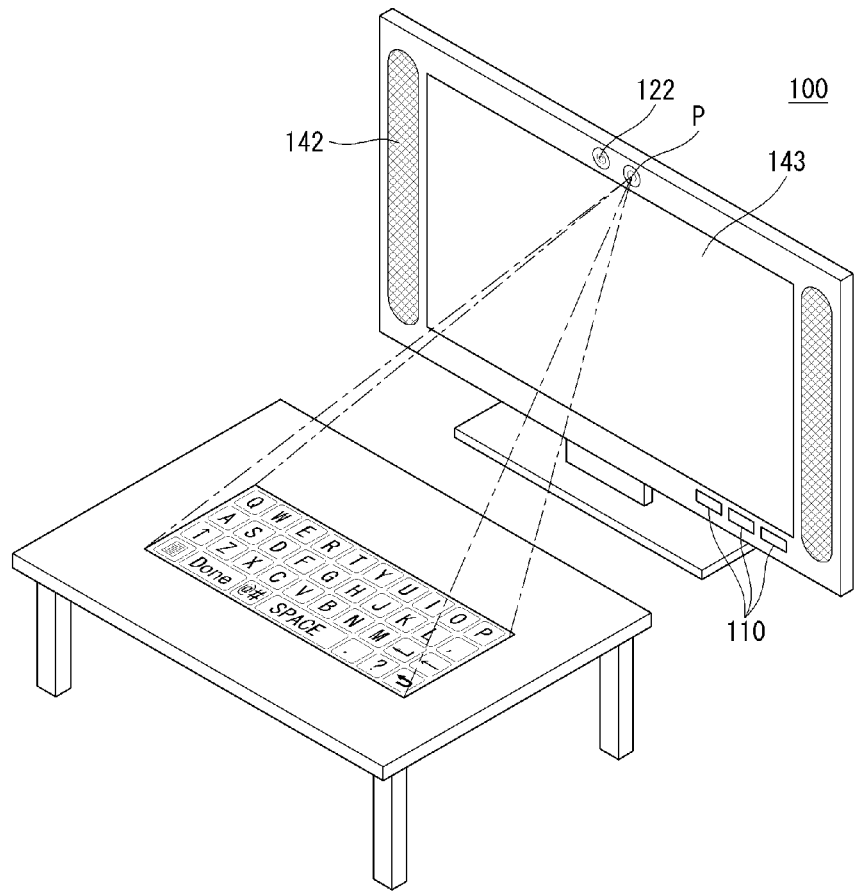
FIG. 6 is a diagram relating to a projection keyboard in the gesture-based key input method according to the first embodiment of the present invention.

The electronic device 100 can display a virtual keyboard at step S110. This step is described with reference to FIGS. 4, 5, and 6. FIG. 4 is a diagram relating to a 2-D virtual keyboard in the gesture-based key input method according to the first embodiment of the present invention, FIG. 5 is a diagram relating to a 3-D virtual keyboard in the gesture-based key input method according to the first embodiment of the present invention, and FIG. 6 is a diagram relating to a projection keyboard in the gesture-based key input method according to the first embodiment of the present invention.

The output module 140 can display the virtual keyboard. Here, the virtual keyboard is a comprehensive concept meaning a logical keyboard, such as an on-screen keyboard existing on a screen, or a soft keyboard processed in software, unlike a physical keyboard physically existing.

For example, the output module 140 may display a 2-D virtual keyboard on a display, as shown in FIG. 4. For another example, the output module 140 may display a 3-D virtual keyboard through a display, as shown in FIG. 5. More particularly, the controller 170 may display the virtual keyboard stereographically using a binocular disparity through a 3-D display or may actually display the virtual keyboard on the 3-D in a 3-D holographic manner using a projector. For another example, the output module 140 may include a projector P, as shown in FIG. 6, and provide the projection keyboard at a specific place through the projector P.

The virtual keyboard may be implemented in a free layout, unlike a hardware keyboard. The virtual keyboard may be implemented using, for example, not only a QWERTY keyboard, but also various layouts, such as 3×3, 3×4, or a numerical keypad. Furthermore, the virtual keyboard may be displayed not only in a single layout, but also a plurality of layouts.

Figure 7:
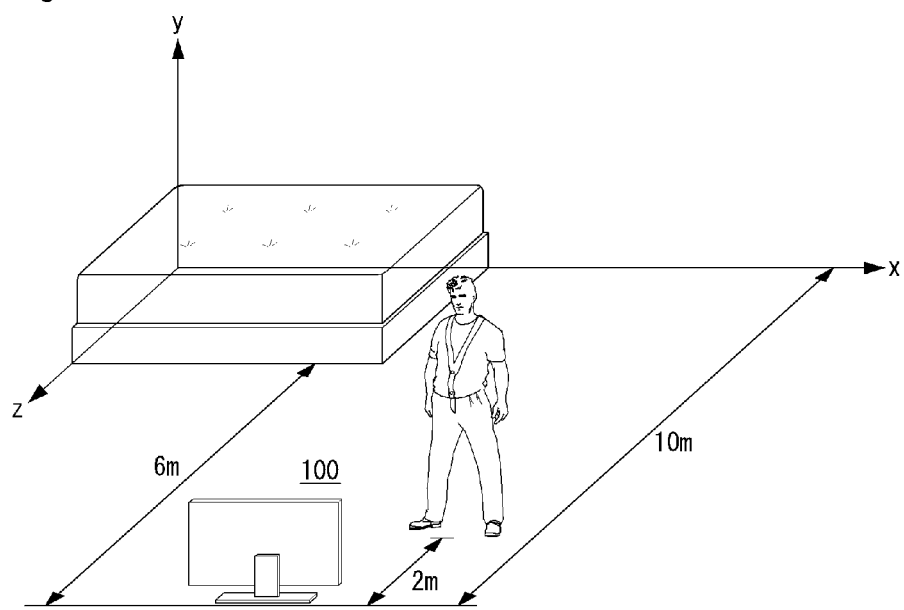
FIG. 7 is a diagram illustrating a method of obtaining a depth image using a TOF camera in the gesture-based key input method according to the first embodiment of the present invention.
Figures 8, 9:
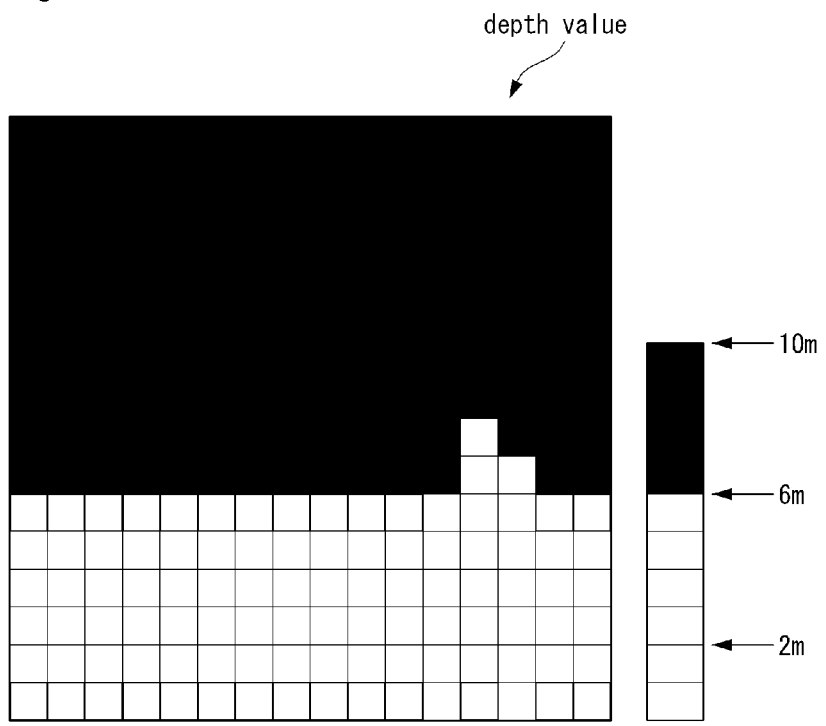
FIG. 8 is a diagram relating to depth information obtained by the TOF camera in the gesture-based key input method according to the first embodiment of the present invention.
FIG. 9 is a diagram relating to a depth image in the gesture-based key input method according to the first embodiment of the present invention.

The electronic device 100 may obtain an image at step S120. This step is described with reference to FIGS. 7, 8, and 9. FIG. 7 is a diagram relating to a 3-D camera for obtaining depth information in the gesture-based key input method according to the first embodiment of the present invention, FIG. 8 is a diagram relating to the depth information in the gesture-based key input method according to the first embodiment of the present invention, and FIG. 9 is a diagram relating to a depth image in the gesture-based key input method according to the first embodiment of the present invention.

The controller 170 may obtain the image.

For example, the controller 170 may obtain a 2-D image. For example, the controller 170 may obtain a 2-D color image through a 2-D camera.

For another example, the controller 170 may obtain a 3-D image, such as a depth image. Here, a method of the controller 170 obtaining the 3-D image may be divided into an indirect method and a direct method.

In the indirect method, depth information is obtained by analyzing two or more 2-D images obtained at different view points. A representative indirect method may include a stereo matching method.

According to the stereo matching method, a reference image and a search image are obtained using left and right cameras. A disparity is calculated using a difference between the reference image and the search image for the same coordinates in space. A 3-D image can be obtained using a disparity map for each pixel of the reference image written according to the calculated disparity.

When a 3-D image is obtained using the indirect method, there are disadvantages in that error is likely to occur according to an illumination condition and the state of texture, reliability is low in a shielding area, and a long time is taken to obtain a dense disparity map because a computational load is great.

In the direct method, distance is directly measured through a 3-D camera, and the controller 170 obtains a depth image based on the measured distance. The direct method may include a method using a structured light camera, a method using a TOF camera, and a 3-D scanning method. The direct method is advantageous in that it can rapidly obtain a depth image reflecting accurate 3-D coordinate values and it does not generate error according to an illumination condition, as compared with the indirect method.

The structured light camera can radiate infrared rays to a subject and obtain depth information up to the subject by analyzing a scattering pattern of the infrared rays returned from the subject. The controller 170 can obtain a 3-D image based on the depth information.

The TOF camera can obtain depth information reflecting distance on the 3-D space, and the controller 170 can obtain a depth image based on the depth information.

As shown in FIG. 7, the video input module 122 implemented using a TOF camera can radiate light to an object and obtain depth information by recognizing distance up to the object based on the time that light reflected from the object takes to return back. For example, the TOF camera may obtain distance up to a person, distance up to a bed, and distance up to a wall as 2 m, 7 m, and 10 m, respectively, as shown in FIG. 7.

The depth information may be represented in the form of a depth value for each pixel, as shown in FIG. 8. The depth value may have a predetermined range of a numerical value. For example, the depth value may have a value ranging from 0 to 255 according to distance. For example, the depth value 0 may correspond to the shortest distance that can be measured by the TOF camera, and the depth value 255 may correspond to the longest distance that can be measured by the TOF camera. The TOF camera may have an improved resolution according to an increase in the range of the depth value. For example, a 3-D camera, having a depth value of 0 to 255 and capable of measuring the depth of a maximum of 10 m, may have resolution of about 40 mm.

The controller 170 may obtain the depth image based on the depth information using the TOF camera. The depth image may be represented by brightness or color corresponding to a depth value. As shown in FIG. 9, the depth image may be an image which is represented by a high luminosity at a close distance and a low luminosity at a long distance. The person closely placed may be represented by white, the bed intermediately placed may be represented by gray, and the wall distantly placed may be represented by black, in the depth image shown in FIG. 9.

When the controller 170 obtains the 3-D image using the TOF camera, it may obtain a real-time 3-D image because it can obtain the depth image of several tens of frames or more per second.

Figure 10:
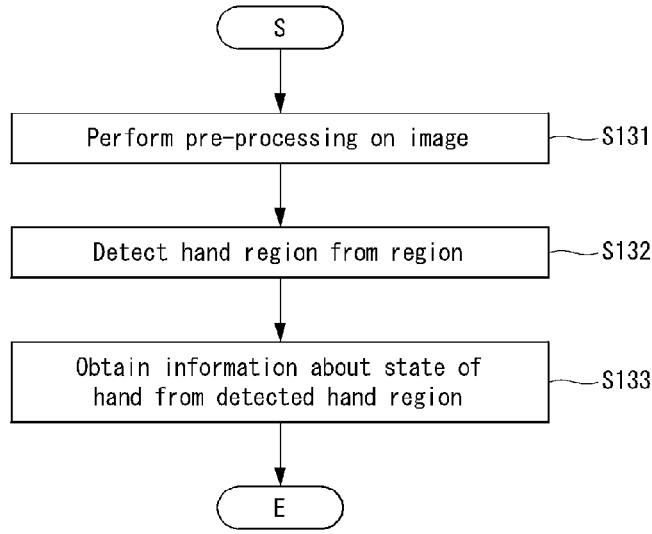
FIG. 10 is a flowchart illustrating a step of obtaining information about the state of the hand by analyzing an image in the gesture-based key input method according to the first embodiment of the present invention.

The electronic device 100 may obtain information about a state of the hand by analyzing the image at step S130. This step is described with reference to FIG. 10. FIG. 10 is a flowchart illustrating the step of obtaining the information about the state of the hand by analyzing the image in the gesture-based key input method according to the first embodiment of the present invention.

The step of obtaining the information about the state of the hand by analyzing the image, as shown in FIG. 10, may comprise at least one of pre-processing the image at step S131, detecting a hand region from the image at step S132, and obtaining the information about the state of the hand from the detected hand region at step S133.

The electronic device 100 may pre-process the image at step S131.

The controller 170 may perform the pre-processing on the obtained image in order to analyze the image.

The pre-processing of the image may comprise at least one of angular correction, tone correction, brightness correction, shadow correction, and noise cancellation for the image. Here, the tone correction may be a process of performing at least one of the graying of the image, the binarization of black and white, and the emphasis of a specific color. The shadow correction may be a process of adjusting the thickness of a boundary line appearing in the image. The noise cancellation may be a process of canceling noise included in the image.

The pre-processed image may have an improved definition, a clearer boundary line, or reduced noise, as compared with an original image. Accordingly, the controller 170 can perform the analysis of the image accurately and easily using the pre-processed image.

Figure 11:
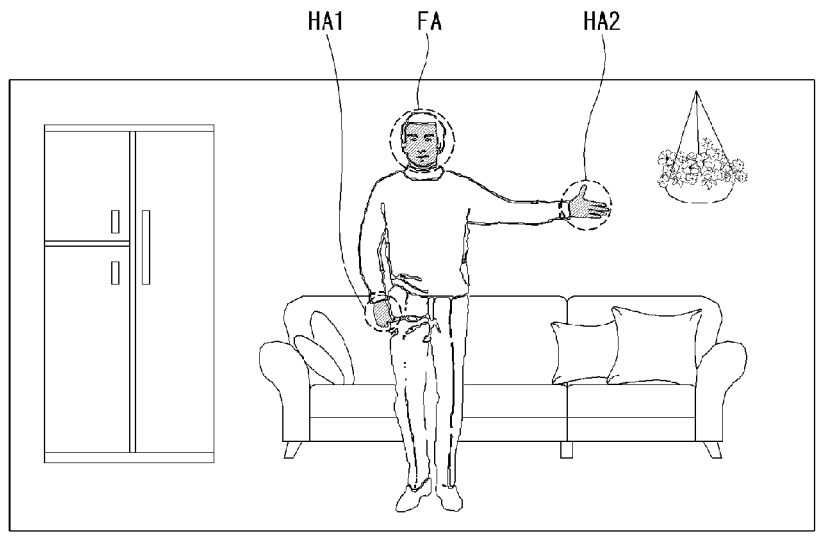
FIG. 11 is a diagram relating to the detection of a hand region using the color of the skin in the gesture-based key input method according to the first embodiment of the present invention.
Figure 12:
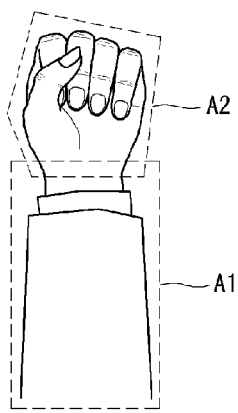
FIG. 12 is a first diagram relating to the detection of a hand region using the shape of the hand in the gesture-based key input method according to the first embodiment of the present invention.
Figure 13:
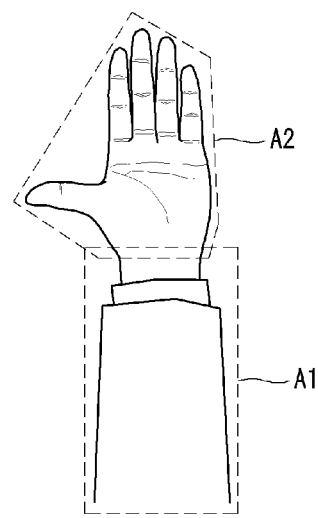
FIG. 13 is a second diagram relating to the detection of a hand region using the shape of the hand in the gesture-based key input method according to the first embodiment of the present invention.

The electronic device 100 may detect the hand region from the image at step S132. This step is described with reference to FIGS. 11, 12, and 13. FIG. 11 is a diagram relating to the detection of the hand region using the color of the skin in the gesture-based key input method according to the first embodiment of the present invention. FIGS. 12 and 13 are diagrams relating to the detection of the hand region using the shape of the hand in the gesture-based key input method according to the first embodiment of the present invention.

The controller 170 can detect the hand region from the image. The controller 170 may identify the hand from the image pre-processed as described above or may identify the hand from an original image.

The controller 170, as shown in FIG. 11, can detect the hand region by tracking a region in which the color value of the image corresponds to the color of the skin. In this case, a region corresponding to a face shown in FIG. 11 may be detected together with the hand. The controller 170 may detect only the hand region HA by distinguishing the face region FA and the hand region HA on the basis of the size or shape of the region.

In order to detect the region in which a color value corresponds to the color of the skin, the controller 170 may use various color spaces. Not only a red-green-blue (RGB) coordinate system, but also a hue-saturation-intensity (HSI) coordinate system, a hue-saturation-lightness (HSL) coordinate system, and an YCrCb coordinate system may be used as the color space. In particular, the tracking of the color of the skin using the color space is likely to be subjected to illumination. If the YCrCb coordinate system is used, the color of the skin can be tracked relatively robustly.

In some embodiments, the controller 170, as shown in FIGS. 12 and 13, may detect the region of the hand by tracking the shape of the hand from the image. The hand of a person includes fingers, and it is connected to a wrist. The controller 170 may extract a boundary line from the image and detect a region, including a quadrangle A1 (that is, the wrist) and a pentagon A2 (that is, the hand), as the hand region using the detected boundary line.

Figure 14:
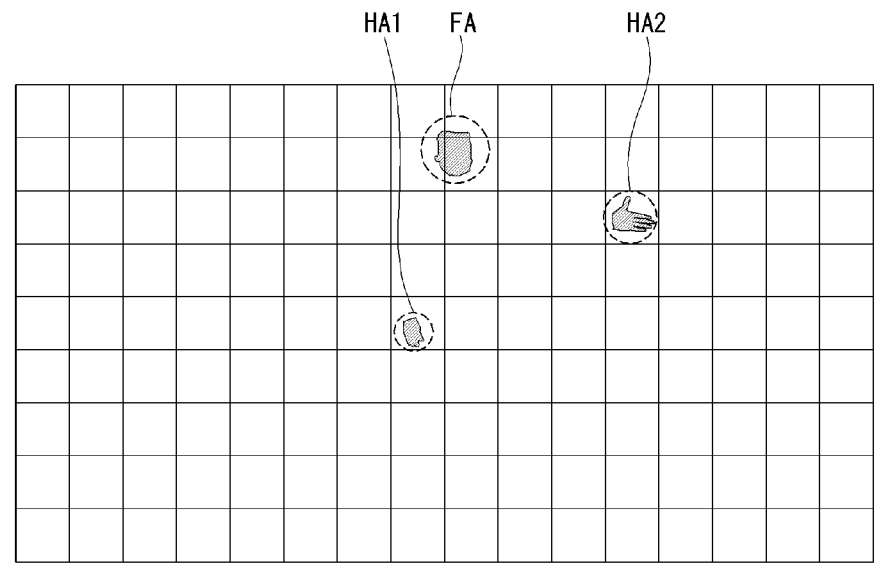
FIG. 14 is a diagram relating to the position of the hand in the gesture-based key input method according to the first embodiment of the present invention.
Figure 15:
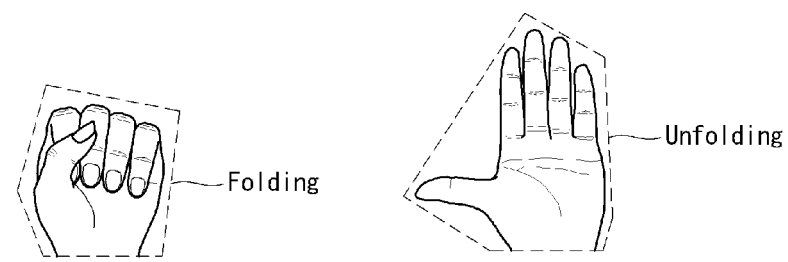
FIG. 15 is a diagram relating to the shape of the hand in the gesture-based key input method according to the first embodiment of the present invention.

The electronic device 100 may obtain the information about the state of the hand from the detected hand region at step S133. This step is described with reference to FIGS. 14 and 15. FIG. 14 is a diagram relating to the position of the hand in the gesture-based key input method according to the first embodiment of the present invention, and FIG. 15 is a diagram relating to the shape of the hand in the gesture-based key input method according to the first embodiment of the present invention.

The controller 170 can obtain the information about the state of the hand from the detected hand region. Here, the information about the state of the hand may include information about the position of the hand and the shape of the hand.

The controller 170, as shown in FIG. 14, can obtain coordinates corresponding to the position of the hand for the detected hand region. In this case, assuming that the coordinates corresponding to the image shown in FIG. 14 include an x axis, having a range of 0 to 15 from the leftmost side to the rightmost side, and an y axis having a range of 0 to 8 from the top to the bottom, the position of a first hand HA1 may have a coordinate value of (4,7), and the position of a second hand HA2 may have a coordinate value of (2,11).

In some embodiments, the controller 170 may determine the shape of the hand from the detected hand region. For example, the hand is extended from the center of the hand to a wrist and five fingers. The controller 170 may determine the shape of the hand by determining whether each of the fingers is unfolded or folded using a method, such as the extraction of a boundary line. For example, the controller 170 may determine whether the hand is in an unfolded state or a folded state by determining whether each of the fingers is unfolded or folded, as shown in FIG. 15.

Figure 16:
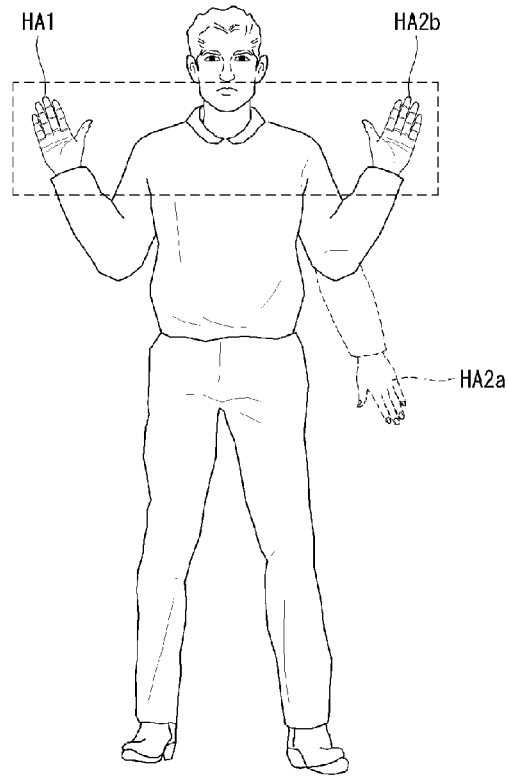
FIG. 16 is a diagram relating to the selection of a typing mode according to the position of the hand in the gesture-based key input method according to the first embodiment of the present invention.
Figure 17:
FIG. 17 is a diagram relating to the selection of a typing mode according to the distance between both hands in the gesture-based key input method according to the first embodiment of the present invention.

The electronic device 100 may select the typing mode on the basis of the information about the state of the hand at step S140. This step is described with reference to FIGS. 16 and 17. FIG. 16 is a diagram relating to the selection of a typing mode according to the position of the hand in the gesture-based key input method according to the first embodiment of the present invention, and FIG. 17 is a diagram relating to the selection of a typing mode according to the distance between both hands in the gesture-based key input method according to the first embodiment of the present invention.

The controller 170 may select a typing mode on the basis of the information about the state of the hand. Here, the typing mode may be divided into a single-hand typing mode and a double-hand typing mode. Alternatively, the typing mode may be divided into a one-finger typing mode and an all-fingers typing mode.

Criteria that the controller 170 determines the typing mode may be various.

For example, the controller 170 may select a typing mode on the basis of the number of the hands placed within a predetermined region as shown in FIG. 16. When the number of the hands placed within the predetermined region is one, the controller 170 may select the single-hand typing mode. When the number of the hands placed within the predetermined region is two, the controller 170 may select the double-hand typing mode.

For another example, the controller 170 may select a typing mode on the basis of the distance between both hands as shown in FIG. 17. When the distance between both hands is greater than a predetermined distance, the controller 170 may select the single-hand typing mode. When the distance between both hands is smaller than a predetermined distance, the controller 170 may select the double-hand typing mode.

For yet another example, the controller 170 may select a typing mode on the basis of the shape of the hand. When the number of the hands assuming a predetermined shape is one, the controller 170 may select the single-hand typing mode. When the number of the hands assuming a predetermined shape is two, the controller 170 may select the double-hand typing mode. Here, the predetermined shape may include a shape that the hand is folded, a shape that the hand is unfolded, or a shape that one finger is unfolded.

In this case, the controller 170 may select one of the one-finger typing mode and the all-fingers typing mode on the basis of the shape of the hand. For example, when only one of the fingers is unfolded, the controller 170 may select the one-finger typing mode. When all the fingers are unfolded, the controller 170 may select the all-fingers typing mode.

Meanwhile, the electronic device 100 needs not to select a typing mode only on the basis of the information about the state of the hand.

For example, the controller 170 may recognize a specific gesture by analyzing an image and select the typing mode on the basis of the specific gesture. More particularly, when a first gesture is recognized, the controller 170 may enter the single-hand typing mode. When a second gesture is recognized, the controller 170 may enter the double-hand typing mode. Alternatively, when the number of the hands performing a specific gesture is one, the controller 170 may enter the single-hand typing mode. When the number of the hands performing a specific gesture is two, the controller 170 may enter the double-hand typing mode.

For another example, when a signal to instruct the entry of a typing mode is received through a remote controller or the input module of a touch screen, the controller 170 may enter the typing mode in response to the signal. Here, the signal to instruct the entry of a typing mode may include information about the selection of the typing mode. The controller 170 may select a typing mode on the basis of the information.

Figure 18:
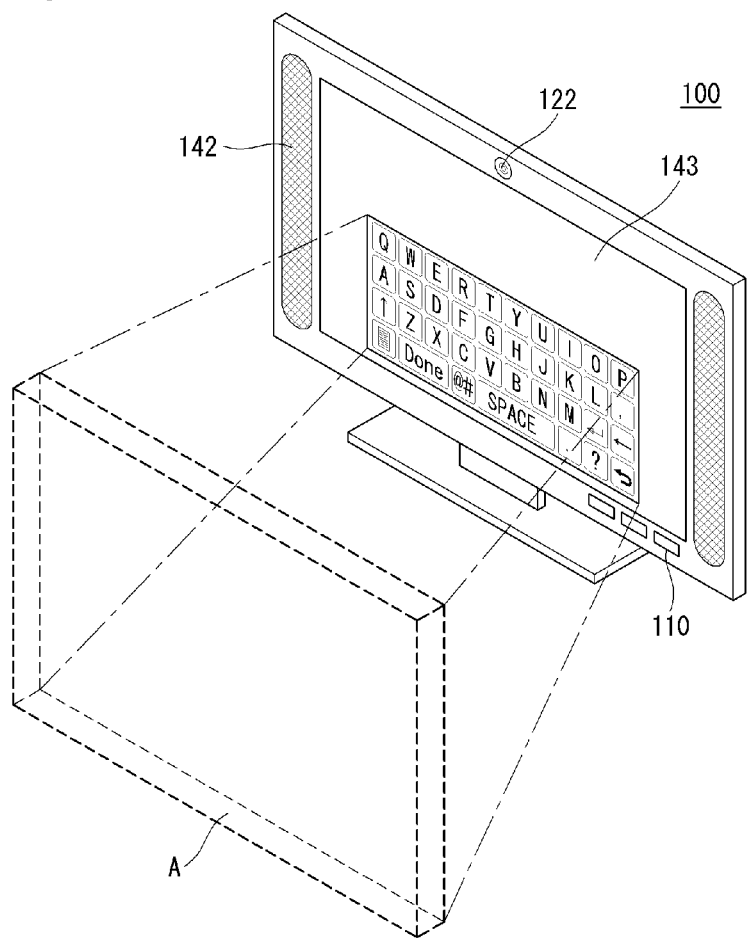
FIG. 18 is a diagram relating to an input region corresponding to a virtual keyboard in the gesture-based key input method according to the first embodiment of the present invention.
Figure 19:
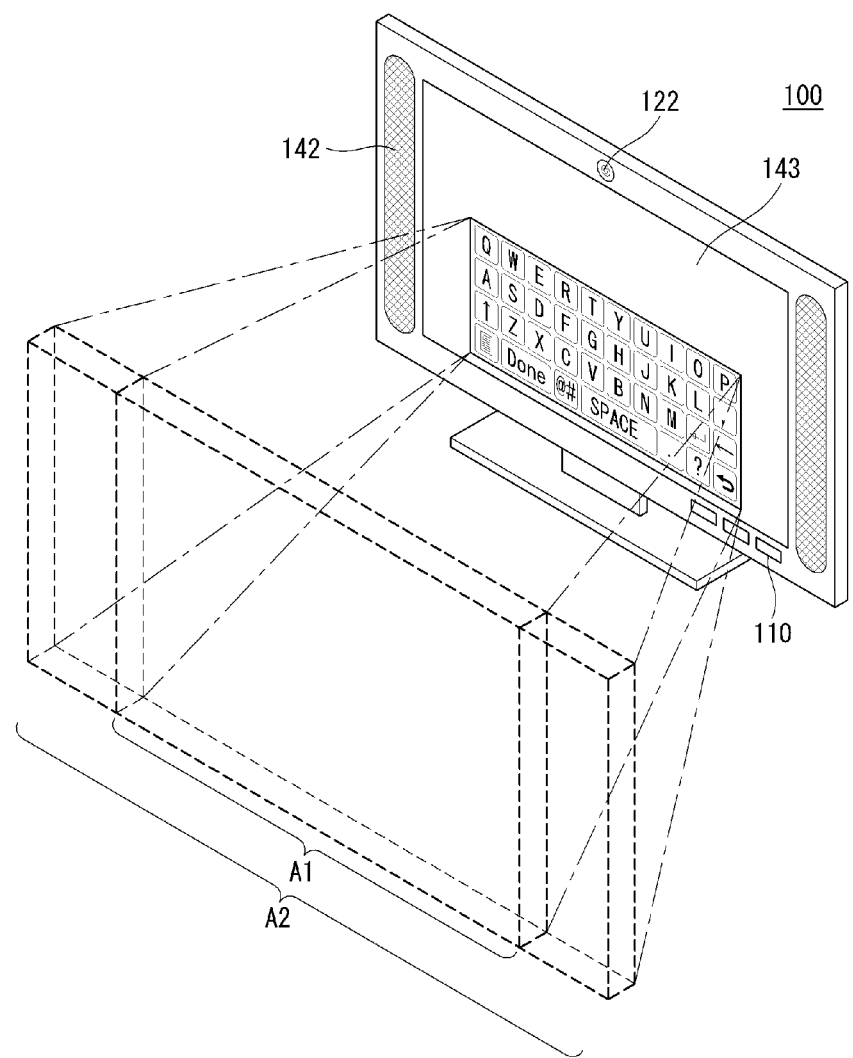
FIG. 19 is a diagram relating to the size of the input region in the gesture-based key input method according to the first embodiment of the present invention.
Figure 20:
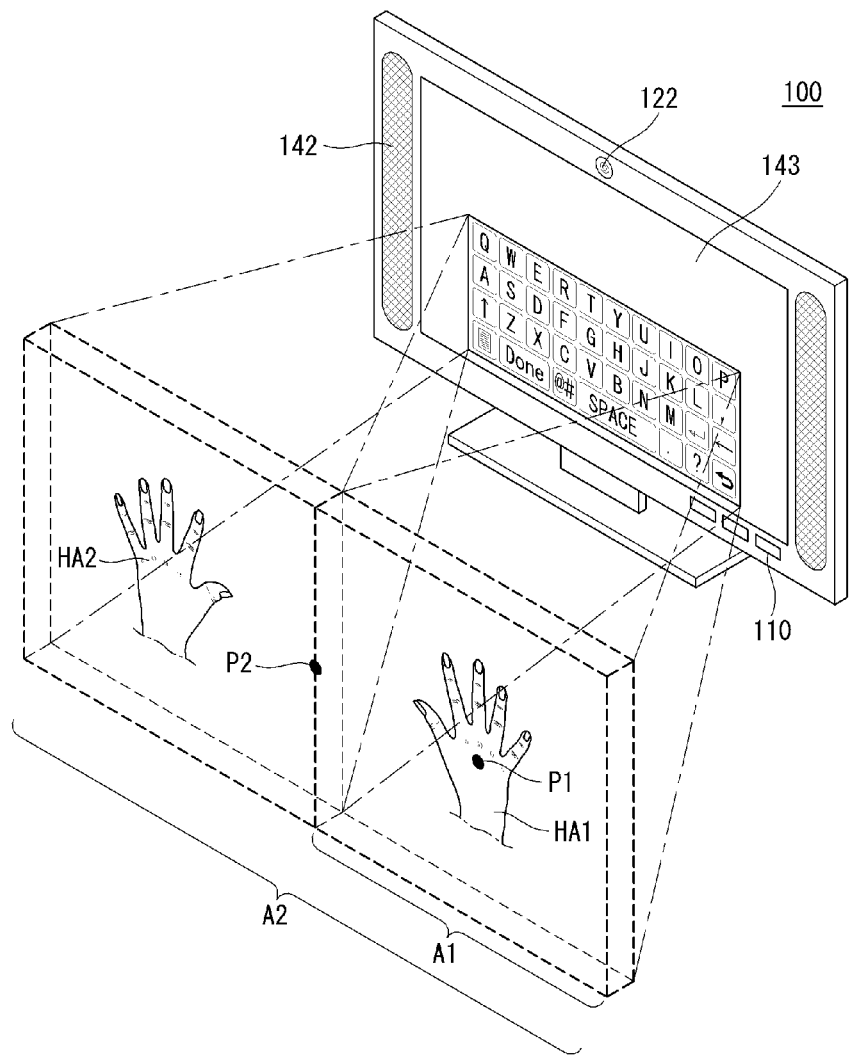
FIG. 20 is a diagram relating to the position of the input region in the gesture-based key input method according to the first embodiment of the present invention.
Figure 21:
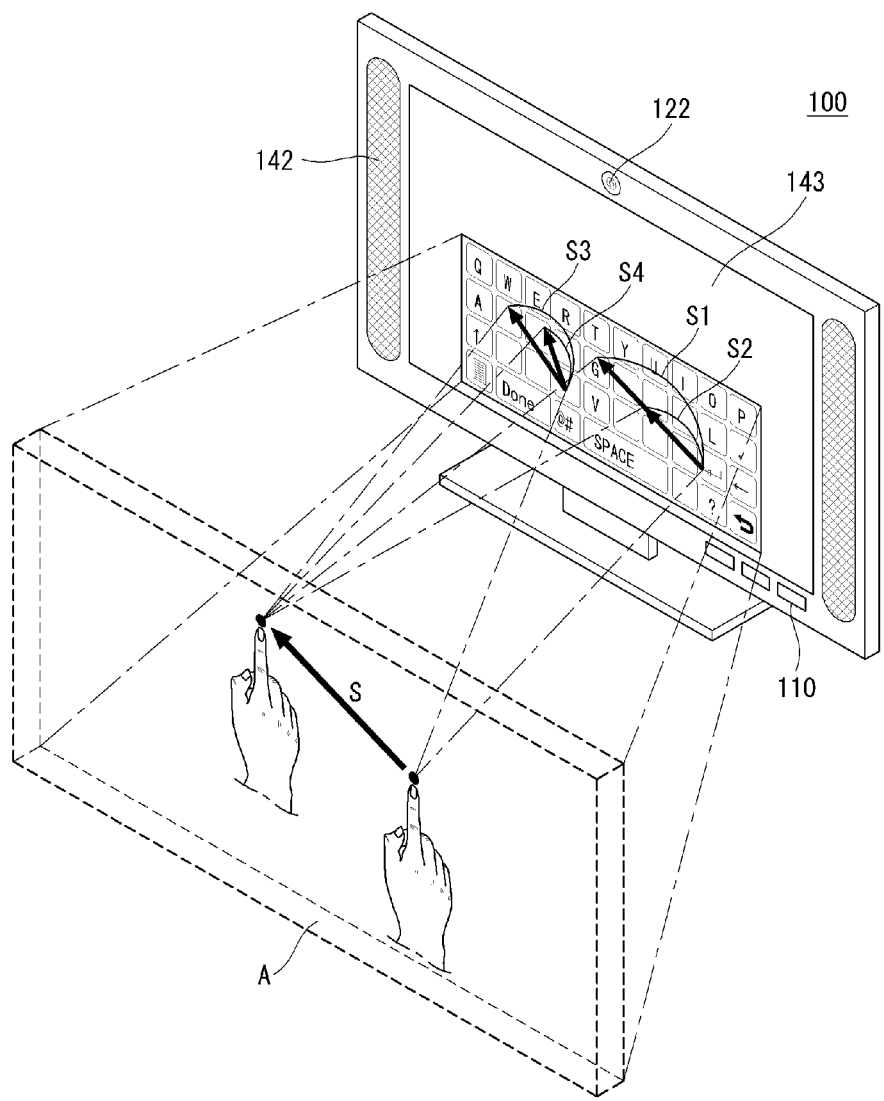
FIG. 21 is a diagram relating to the sensitivity of an input region in the gesture-based key input method according to the first embodiment of the present invention.
Figure 22:
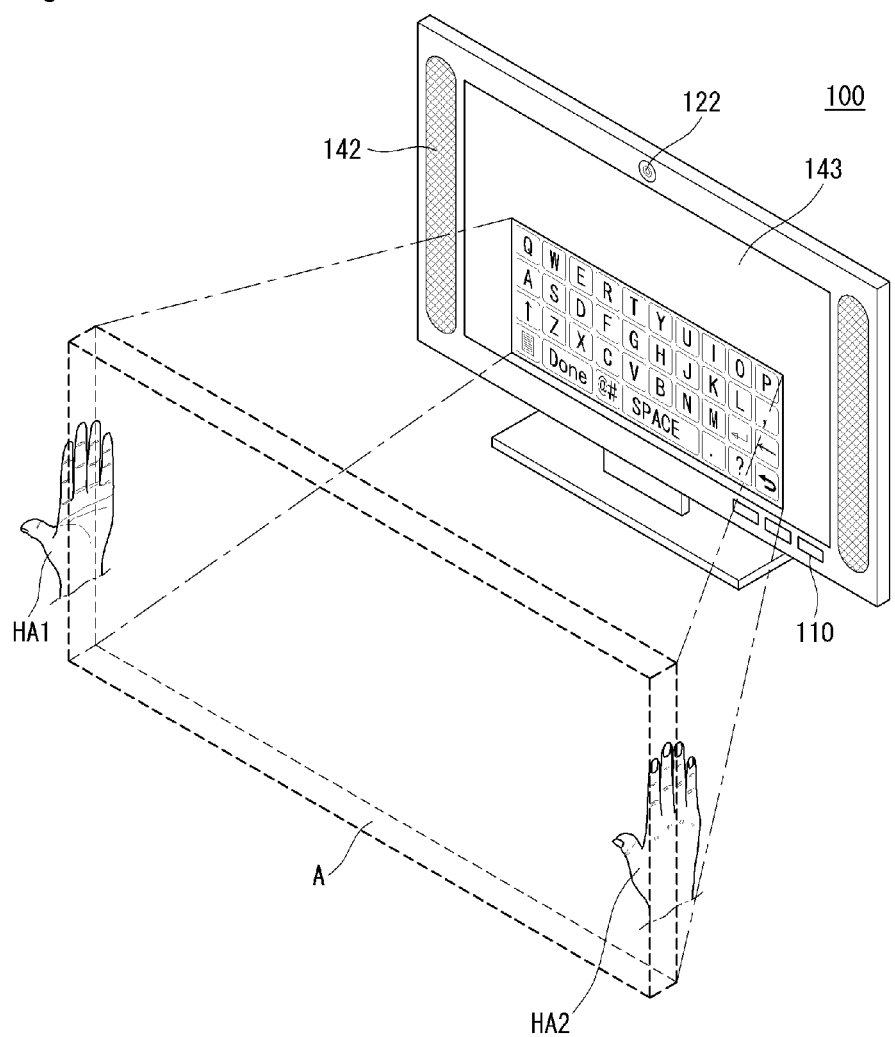
FIG. 22 is a first diagram relating to the size of an input region in the case of a double-hand typing mode in the gesture-based key input method according to the first embodiment of the present invention.
Figure 23:
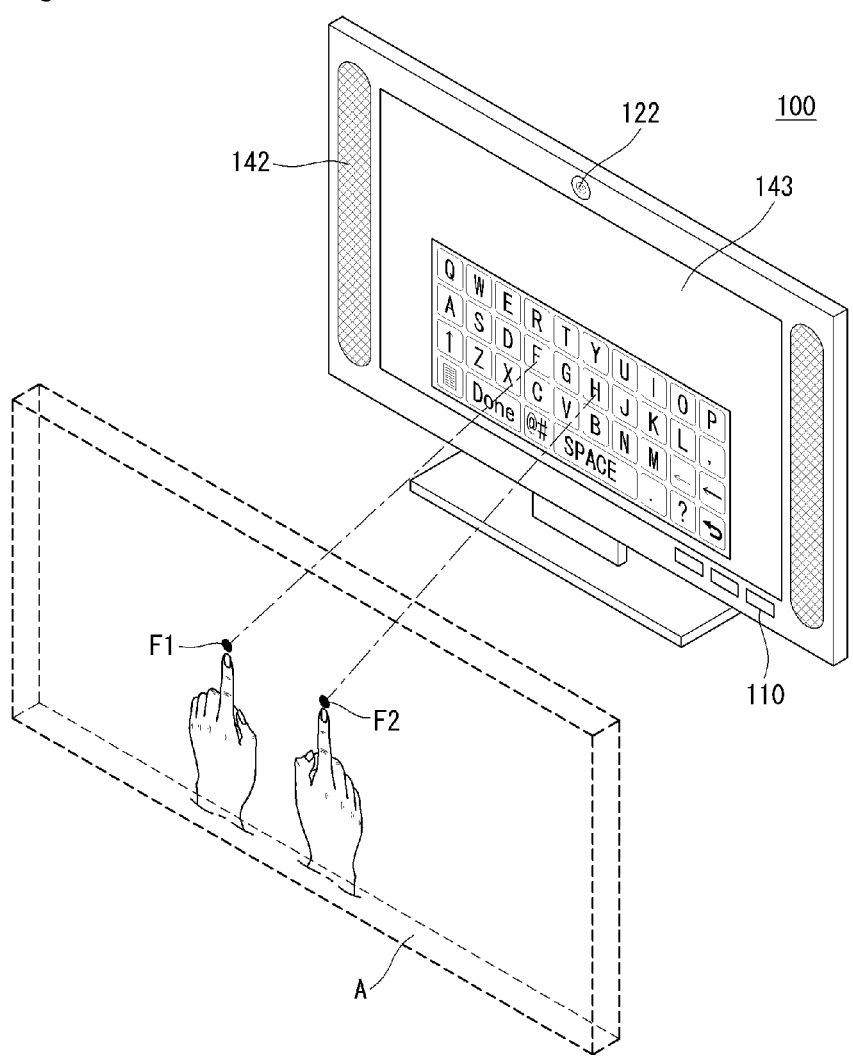
FIG. 23 is a second diagram relating to the size of an input region in the case of the double-hand typing mode in the gesture-based key input method according to the first embodiment of the present invention.
Figure 24:
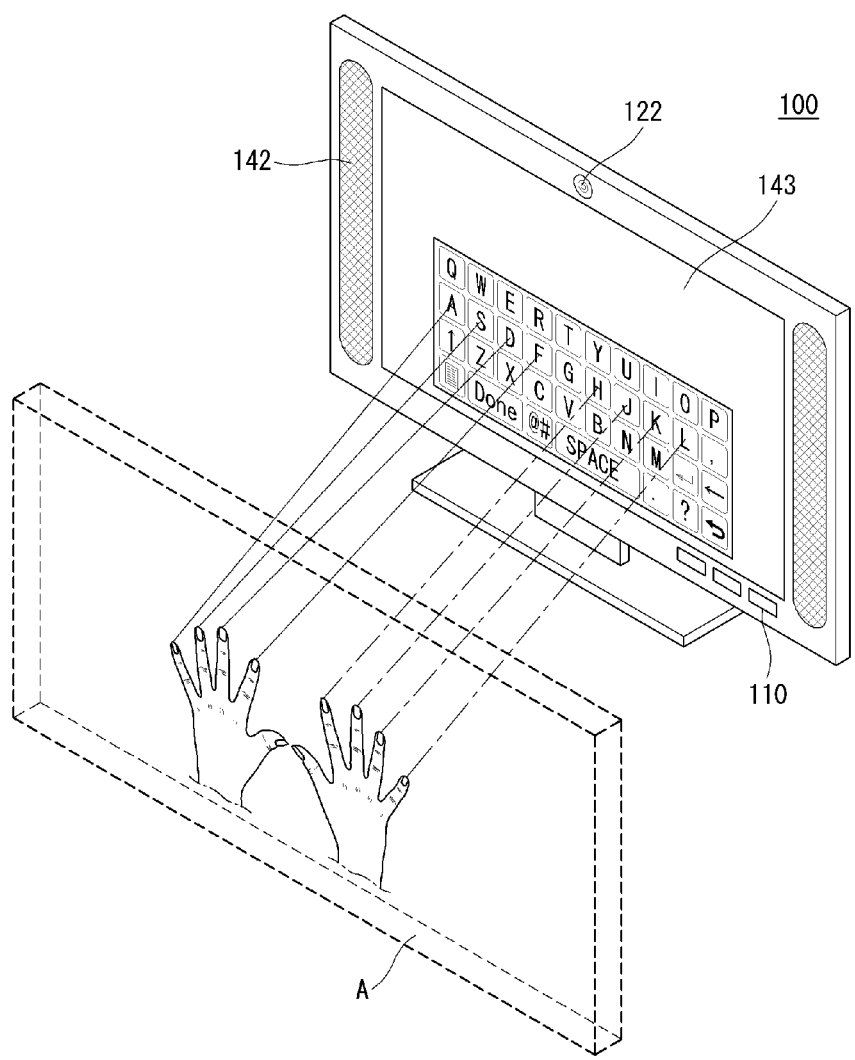
FIG. 24 is a third diagram relating to the size of an input region in the case of the double-hand typing mode in the gesture-based key input method according to the first embodiment of the present invention.
Figure 25:
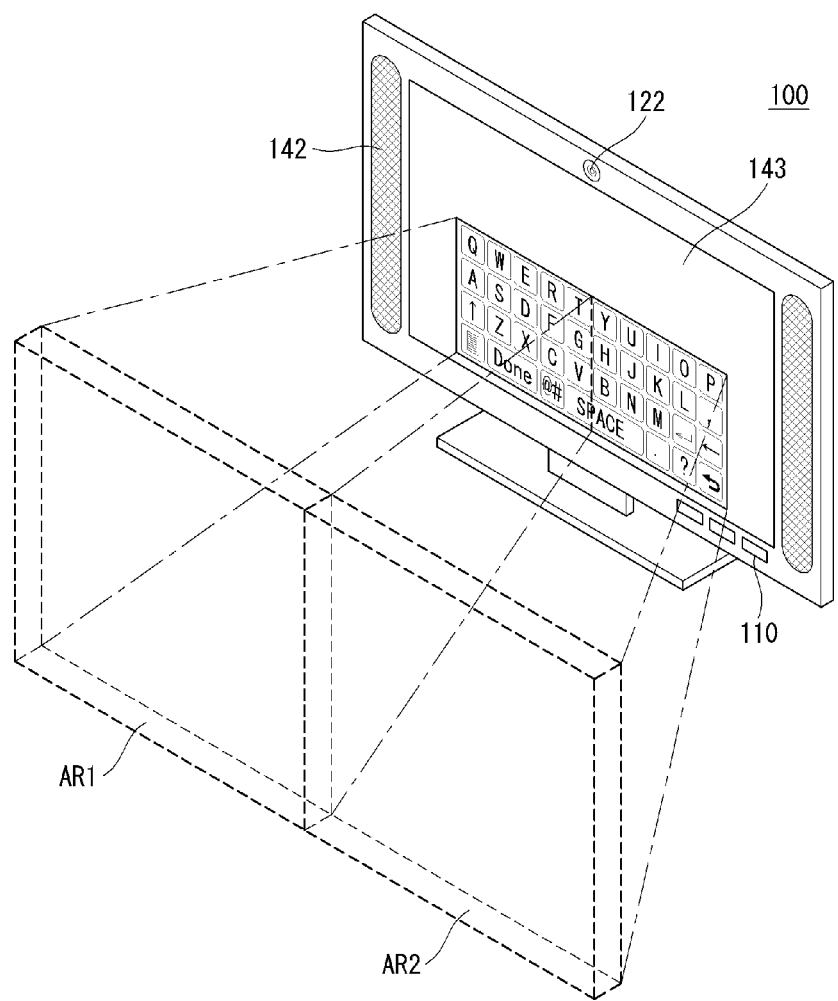
FIG. 25 is a diagram relating to a first input region and a second input region which are adjacent to each other in the gesture-based key input method according to the first embodiment of the present invention.
Figure 26:
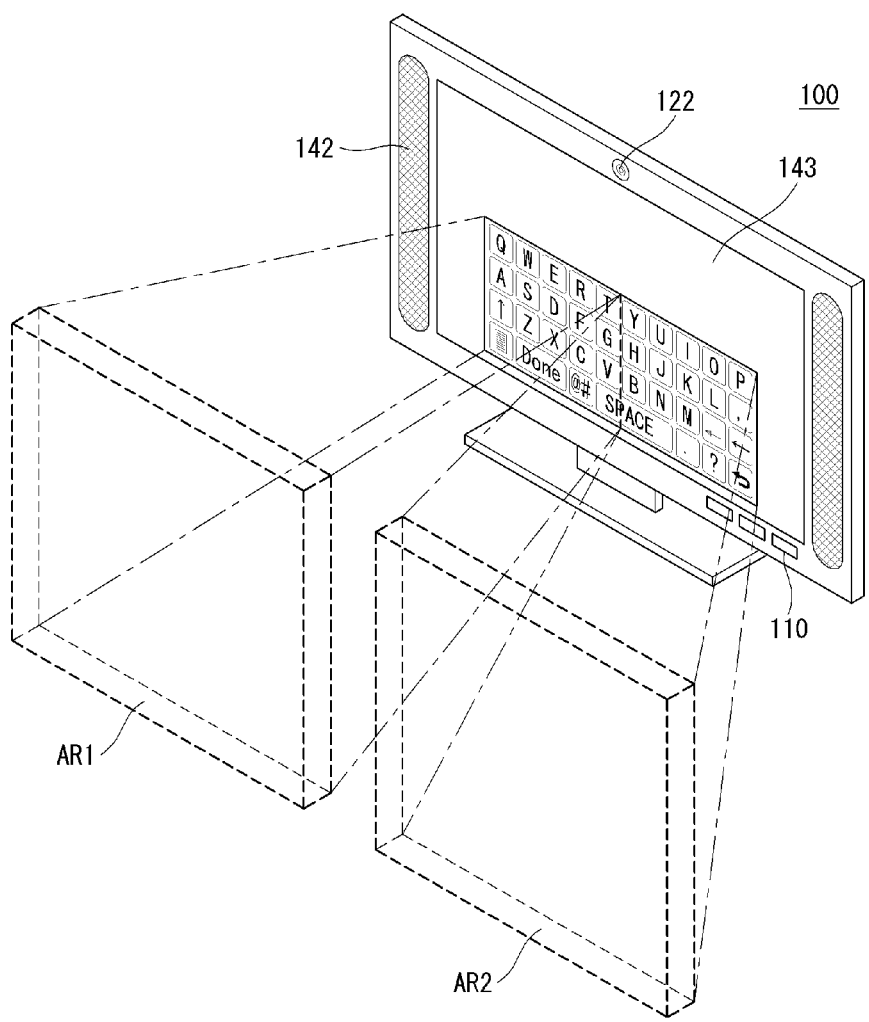
FIG. 26 is a diagram relating to a first input region and a second input region which are spaced apart from each other in the gesture-based key input method according to the first embodiment of the present invention.

The electronic device 100 may set an input region corresponding to the virtual keyboard according to the selected typing mode at step S150. This step is described with reference to FIGS. 18 to 26. FIG. 18 is a diagram relating to an input region corresponding to a virtual keyboard in the gesture-based key input method according to the first embodiment of the present invention. FIG. 19 is a diagram relating to the size of the input region in the gesture-based key input method according to the first embodiment of the present invention. FIG. 20 is a diagram relating to the position of the input region in the gesture-based key input method according to the first embodiment of the present invention. FIG. 21 is a diagram relating to the sensitivity of the input region in the gesture-based key input method according to the first embodiment of the present invention. FIGS. 22, 23, and 24 are diagrams relating to the size of the input region in the case of the double-hand typing mode in the gesture-based key input method according to the first embodiment of the present invention. FIG. 25 is a diagram relating to a first input region and a second input region which are adjacent to each other in the gesture-based key input method according to the first embodiment of the present invention. FIG. 26 is a diagram relating to a first input region and a second input region which are spaced apart from each other in the gesture-based key input method according to the first embodiment of the present invention.

The controller 170 may set the input region corresponding to the virtual keyboard according to the selected typing mode. Here, the input region corresponding to the virtual keyboard is a region set on the 3-D space. The positions of the input region may correspond to respective coordinates on the displayed virtual keyboard. As shown in FIG. 18, the controller 170 may set an input region corresponding to a virtual keyboard on the 3-D space. Here, the input region may be set in space between a user and the virtual keyboard. The boundary line of the input region may be identical to the boundary line of the virtual keyboard, and one point within the input region may correspond to one point on the virtual keyboard.

The controller 170 may control the attribute of the input region according to the typing mode.

A user's requirements to conveniently perform input may be different according to the selected typing mode. In the case of the single-hand typing mode, a user performs gesture for the entire input region with one hand and thus performs a lot of actions using the hand and an arm. Accordingly, there is a need for an input region which can minimize the fatigue of the hand and the arm. In the case of the double-hand typing mode, a user will perform gesture for an input region by properly distributing the input region into both hands. That is, the user may perform gesture for the right part of the input region with the right hand and perform gesture for the left part of the input region with the left hand. In this case, the fatigue of each of the hands and each of the arms will be much lower than that in the case of the single-hand typing mode. Accordingly, in the case of the double-hand typing mode, there is a need for an input region in which input can be performed more accurately.

The controller 170 can control an attribute of the input region so that it corresponds to requirements according to each typing mode. The attribute of the input region may include at least one of a size, position, and sensitivity of the input region. The sensitivity of the input region may mean a moving distance on the virtual keyboard according to the movement of a position of the hand in the input region.

For example, as shown in FIG. 19, when the single-hand typing mode is selected, the controller 170 may set an input region so that the input region has a first size. When the double-hand typing mode is selected, the controller 170 may set an input region so that the input region has a second size. Here, the first size may be smaller than the second size. More particularly, at least one of an x-axis size and a y-axis size of the input region having the first size may be smaller than at least one of an x-axis size and a y-axis size of the input region having the second size. In other words, the y-axis size of the input region having the first size is identical to the y-axis size of the input region having the second size, and the x-axis size of the input region having the first size may be smaller than the x-axis size of the input region having the second size.

For another example, when the single-hand typing mode is selected as shown in FIG. 20, the controller 170 may set an input region on the basis of the position of a first hand. When the double-hand typing mode is selected, the controller 170 may set an input region on the basis of the positions of a first hand and a second hand. More particularly, when the single-hand typing mode is selected, the controller 170 may set the input region so that the center of the input region is placed at the center of the first hand. When the double-hand typing mode is selected, the controller 170 may set the input region so that the center of the input region is placed at the center of the input region between the first hand and the second hand.

For yet another example, as shown in FIG. 21, the controller 170 may differently set sensitivity S according to a typing mode. When a user moves his hand by a certain distance within an input region, the controller 170 may set the sensitivity so that the hand is moved by a first distance on a virtual keyboard in the single-hand typing mode and may set the sensitivity so that the hand is moved by a second distance on a virtual keyboard in the double-hand typing mode. Here, the first distance may be greater than the second distance. Furthermore, at least one of an x-axis distance and a y-axis distance of the first distance may be greater than at least one of an x-axis distance and a y-axis distance of the second distance. More particularly, when a user moves his hand by a certain distance in the input region, a y-axis distance on a virtual keyboard according to the single-hand typing mode may be the same as a y-axis distance on the virtual keyboard according to the double-hand typing mode, and an x-axis distance on the virtual keyboard according to the single-hand typing mode may be greater than an x-axis distance on the virtual keyboard according to the double-hand typing mode.

When the double-hand typing mode is selected, the controller 170 may control an attribute of the input region by further taking at least one of the distance between both hands and the shape of the hand, calculated by analyzing an image, into consideration.

For example, the controller 170 may control the size of a virtual input region based on the distance between both hands. As shown in FIG. 22, the controller 170 may control the size of the input region so that the distance between a first hand and a second hand is identical to the width on the left and right of the input region. Alternatively, as shown in FIG. 23, the controller 170 may determine the size of an input region corresponding to a virtual keyboard on the basis of the distance between the first finger of a first hand and the second finger of a second hand. When the virtual keyboard is provided in the form of a QWERTY keyboard, the controller 170 may control the size of an input region so that the position of a first finger corresponds to a first key and the position of a second finger corresponds to a second key.

For another example, when the shape of the hand has a state in which one finger is unfolded, the controller 170 may set an input region small. When the shape of the hand has a state in which all fingers are unfolded, the controller 170 may set an input region large. In particular, in the case where a virtual keyboard is provided in the form of a QWERTY keyboard, the controller 170 may set an input region so that each of the keys of the virtual keyboard is allocated to the position of each of the fingers when all the fingers are in an unfolded state. More particularly, as shown in FIG. 24, the controller 170 may set an input region corresponding to the virtual keyboard so that keys A, S, D, and F are allocated to the respective positions of the fingers from a little finger in the case of the left hand and keys H, J, K, and L are allocated to the respective positions of the fingers from an index finger in the case of the right hand.

Furthermore, when the double-hand typing mode is selected, the controller 170 may set an input region so that the input region includes a first input region and a second input region which are spatially distinguished from each other. The controller 170 may set the first input region on the basis of the position of a first hand and set the second input region on the basis of a second hand. Here, the first region and the second region may be adjacent to each other on the 3-D space as shown in FIG. 25 or may be spaced apart from each other on the 3-D space as shown in FIG. 26. In this case, the controller 170 may control an attribute of the input region so that only gesture of the first hand is recognized in relation to the first input region and only gesture of the second hand is recognized in relation to the second input region.

Meanwhile, the controller 170 may control an attribute of the input region by further taking the distance up to a user or the distance up to a user's hand into consideration. The controller 170 will capture an image for an input region using a camera in order to recognize gesture of a user for the input region. The capturing range of the camera may be changed according to distance on a z axis where the input region is set, in relation to an input region having the same size. Accordingly, the controller 170 may control the capturing range of the camera, corresponding to the input region, based on a z-axis distance where the input region is set (that is, according to the distance from the camera to the user or the user's hand.

Figure 27:
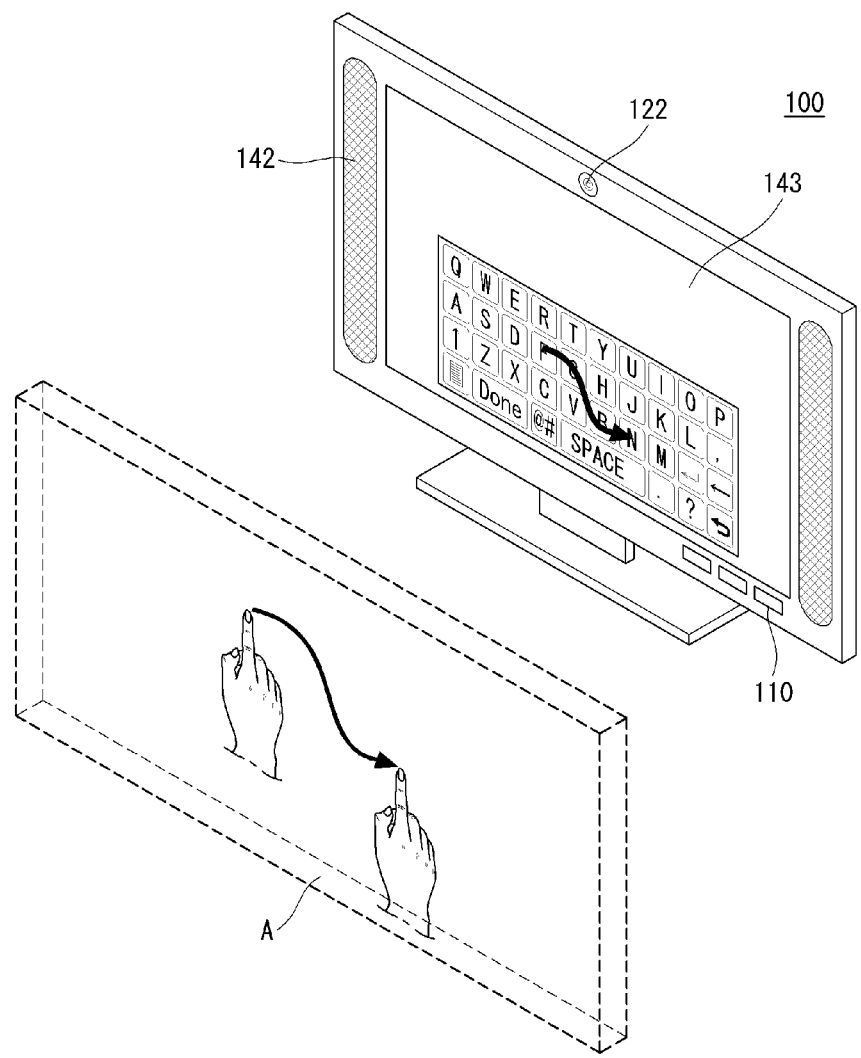
FIG. 27 is a diagram relating to a hovering gesture in the gesture-based key input method according to the first embodiment of the present invention.
Figure 28:
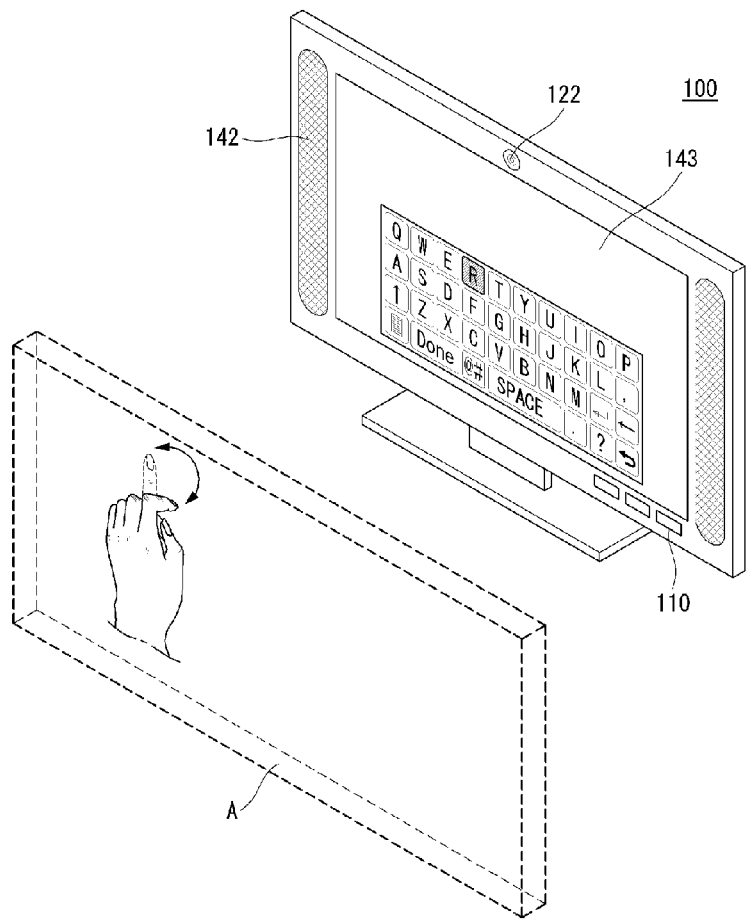
FIG. 28 is a diagram relating to a stroke gesture in the gesture-based key input method according to the first embodiment of the present invention.

The electronic device 100 may recognize gesture for the input region by analyzing the image at step S160. This step is described with reference to FIGS. 27 and 28. FIG. 27 is a diagram relating to a hovering gesture in the gesture-based key input method according to the first embodiment of the present invention, and FIG. 28 is a diagram relating to a stroke gesture in the gesture-based key input method according to the first embodiment of the present invention.

The controller 170 can recognize gesture for the input region by analyzing the image. Here, the gesture for the input region may include at least one of a hovering gesture and a stroke gesture. The hovering gesture may mean a gesture in which the hand is moved within an input region. The stroke gesture is a gesture in which a finger takes a predetermined action at a specific position within an input region, and it may mean a predetermined gesture to indicate input for a specific key on a virtual keyboard corresponding to a specific position within an input region.

The controller 170 may recognize a hovering gesture for an input region by analyzing an image. As shown in FIG. 27, when the hand is moved within an input region, the controller 170 may recognize such movement as a hovering gesture.

The controller 170 can detect a hand region from an image obtained as described above and, when the detected hand region is moved within the image, recognize such movement as a hovering gesture. Here, the controller 170 may track the position of a specific finger of a moving hand. More particularly, the controller 170 may find the end of a finger by analyzing the image of the detected hand region and track a position of the end of the finger.

The controller 170 may recognize a stroke gesture for an input region by analyzing an image. As shown in FIG. 28, when the hand is substantially fixed within an input region and a specific finger takes a specific action, the controller 170 may recognize the action as a stroke gesture.

The controller 170 may detect a hand region from an image as described above. When a specific finger takes a specific action (for example, a specific finger takes an action to reciprocate in a direction in which a hand not fixed is not fixed on the 3-D space) in the state in which the detected hand region is substantially fixed in at least one direction on the 3-D space within the image, the controller 170 may recognize the action as a stroke gesture. More particularly, the controller 170 may analyze an image. If, as a result of the analysis, a specific finger takes an action to reciprocate in the z-axis direction with the hand being fixed in the x-axis and y-axis directions, the controller 170 may recognize the action as a stroke gesture.

Meanwhile, a method of recognizing gesture by analyzing an image is not limited to the above examples and may be performed using other methods of recognizing gesture, which are evident to a person having ordinary skill in the art to which the present invention pertains.

The electronic device 100 may obtain a key input based on the gesture at step S170. This step is described with reference to FIG. 27. The controller 170 may obtain a key input based on the recognized gesture.

The controller 170 may track a position of the end of a finger by recognizing a hovering gesture. As shown in FIG. 27, the controller 170 may determine coordinates on a virtual keyboard corresponding to a position on the virtual keyboard, corresponding to the position within an input region, from a position of the end of a finger within the input region. The controller 170 may determine specific keys on the virtual keyboard based on the coordinates on the virtual keyboard.

The controller 170 may obtain a key input for specific keys based on a stroke gesture. The controller 170 may recognize a stroke gesture, recognize a hovering gesture, and obtain a key input for specific keys on a virtual keyboard.

In accordance with the gesture-based key input method according to the first embodiment of the present invention, when a key input is performed through gesture for an input region corresponding to a virtual keyboard, an appropriate input region can be provided according to a typing method of performing input through gesture.

Accordingly, when performing a key input, a user can accurately perform the key input without a feeling of fatigue.

Figure 29:
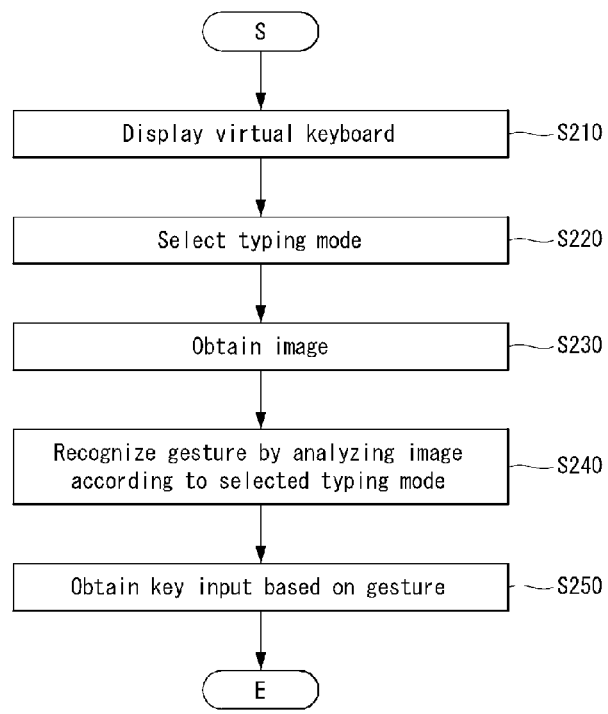
FIG. 29 is a flowchart illustrating a second embodiment of a gesture-based key input method according to the present invention.

Hereinafter, a gesture-based key input method according to the second embodiment of the present invention is described with reference to FIG. 29. FIG. 29 is a flowchart illustrating the gesture-based key input method according to the second embodiment of the present invention.

The gesture-based key input method according to the second embodiment of the present invention may comprise at least one of displaying a virtual keyboard at step S210, selecting a typing mode at step S220, obtaining an image at step S230, recognizing gesture by analyzing the image according to the selected typing mode at step S240, and obtaining a key input based on the gesture at step S250, as shown in FIG. 29.

Each of the steps of the gesture-based key input method according to the second embodiment of the present invention is described below.

Here, displaying the virtual keyboard at step S210, selecting the typing mode at step S220, and obtaining the image at step S230 may be the same as or similar to those of the gesture-based key input method according to the first embodiment of the present invention, and thus a description of them is omitted for simplicity.

The electronic device 100 may recognize gesture by analyzing the image according to the selected typing mode at step S240.

The controller 170 may recognize the gesture by analyzing the image according to the selected typing mode.

For example, when the single-hand typing mode is entered, the controller 170 may recognize only gesture for an input region performed by a first hand and disregard gesture for an input region performed by a second hand, by analyzing the image.

Here, the term 'first hand' may mean the hand determined to be used in the single-hand typing mode. More particularly, in the case where a typing mode is selected based on the number of the hands placed within a predetermined region, when the number of the hands placed within the predetermined region is one, the first hand may mean the one hand. Likewise, in the case where a typing mode is selected based on the number of the hands assuming a specific shape, the first hand may mean the hand assuming the specific shape.

For another example, when the double-hand typing mode is entered, the controller 170 may recognize gestures, performed by both a first hand and a second hand, by analyzing an image. Here, the controller 170 may recognize the gesture of the first hand and the gesture of the second hand, performed within an input region, without distinction. In some embodiments, the controller 170 may separate a first input region and a second input region as described above, recognize only the gesture performed by the first hand in relation to the first input region, and recognize only the gesture performed by the second hand in relation to the second input region.

The electronic device 100 can obtain a key input based on the gesture at step S250.

The controller 170 can obtain the key input based on the recognized gesture. For example, when the single-hand typing mode is selected, the controller 170 may obtain the key input based on only the gesture performed by the first hand as described above. For another example, the controller 170 may obtain a key input based on only the gesture performed by the first hand in relation to the first region and may obtain a key input based on only the gesture performed by the second hand in relation to the second region.

In accordance with the gesture-based key input method according to the second embodiment of the present invention, when a key input is performed through gesture for an input region corresponding to a virtual keyboard, only gesture of a necessary hand may be recognized according to a typing method of performing input through gesture.

Accordingly, there are advantages in that a computational load of the electronic device 100 can be reduced and the electronic device 100 does not erroneously recognize gesture according to the movement of the hand not used for input.

Figure 30:
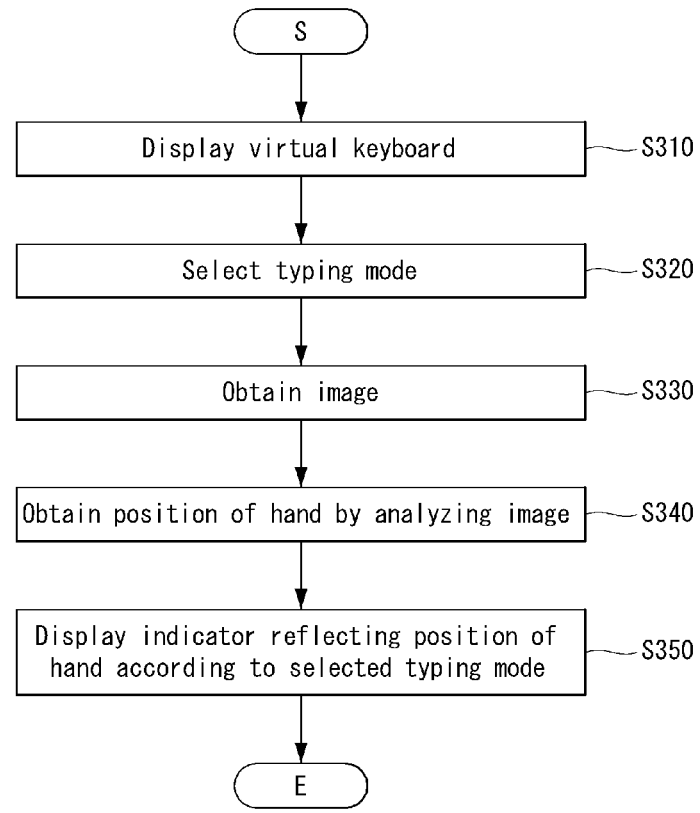
FIG. 30 is a flowchart illustrating a gesture-based key input method according to a third embodiment of the present invention.

Hereinafter, a gesture-based key input method according to a third embodiment of the present invention is described with reference to FIG. 30. FIG. 30 is a flowchart illustrating the gesture-based key input method according to the third embodiment of the present invention.

The gesture-based key input method according to the third embodiment of the present invention may comprise at least one of displaying a virtual keyboard at step S310, selecting a typing mode at step S320, obtaining an image at step S330, obtaining a position of the hand by analyzing the image at step S340, and displaying an indicator, reflecting the position of the hand, according to the selected typing mode at step S350, as shown in FIG. 30.

Each of the steps of the gesture-based key input method according to the third embodiment of the present invention is described below.

Here, displaying the virtual keyboard at step S310, selecting the typing mode at step S320, and obtaining the image at step S330 may be the same as or similar to those of the gesture-based key input methods according to the first and second embodiments of the present invention, and thus a description of them is omitted for simplicity.

The electronic device 100 may obtain the position of the hand by analyzing the image at step S340.

The controller 170 may obtain the position of the hand or a position of the end of a finger by analyzing the image as described above.

Figure 31:
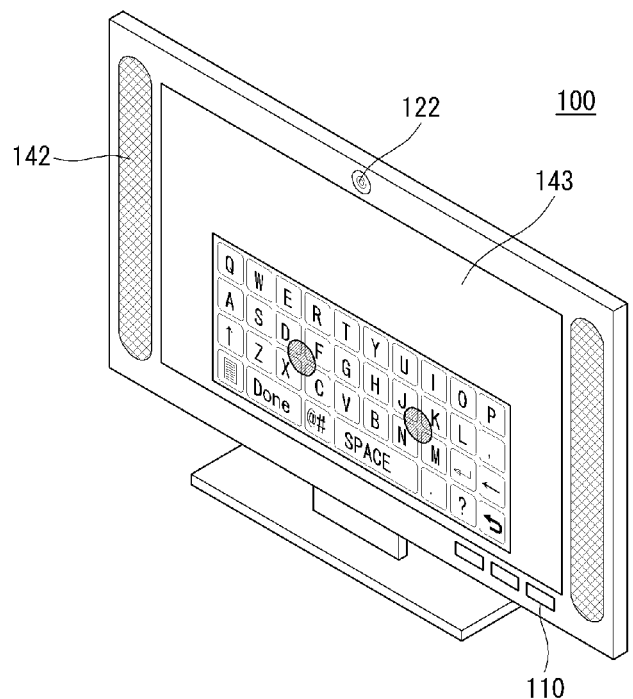
FIG. 31 is a diagram relating to indicators according to a typing mode in the gesture-based key input method according to the third embodiment of the present invention.
Figure 32:
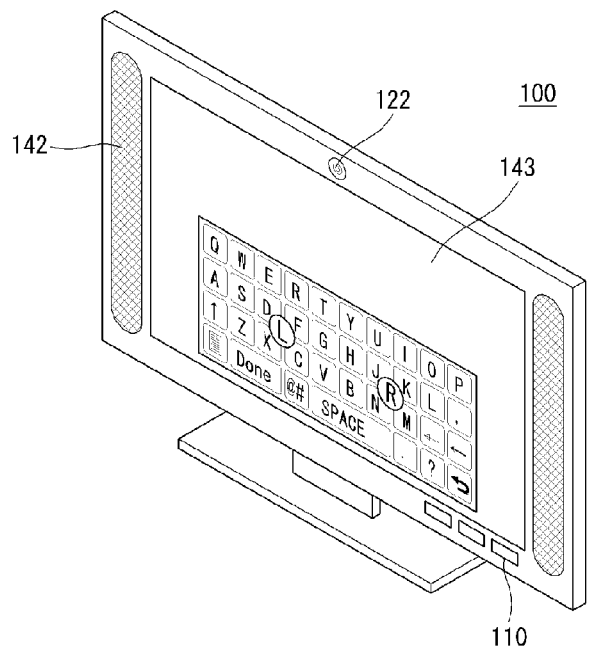
FIG. 32 is a diagram relating to indicators according to the double-hand typing mode in the gesture-based key input method according to the third embodiment of the present invention.
Figure 33:
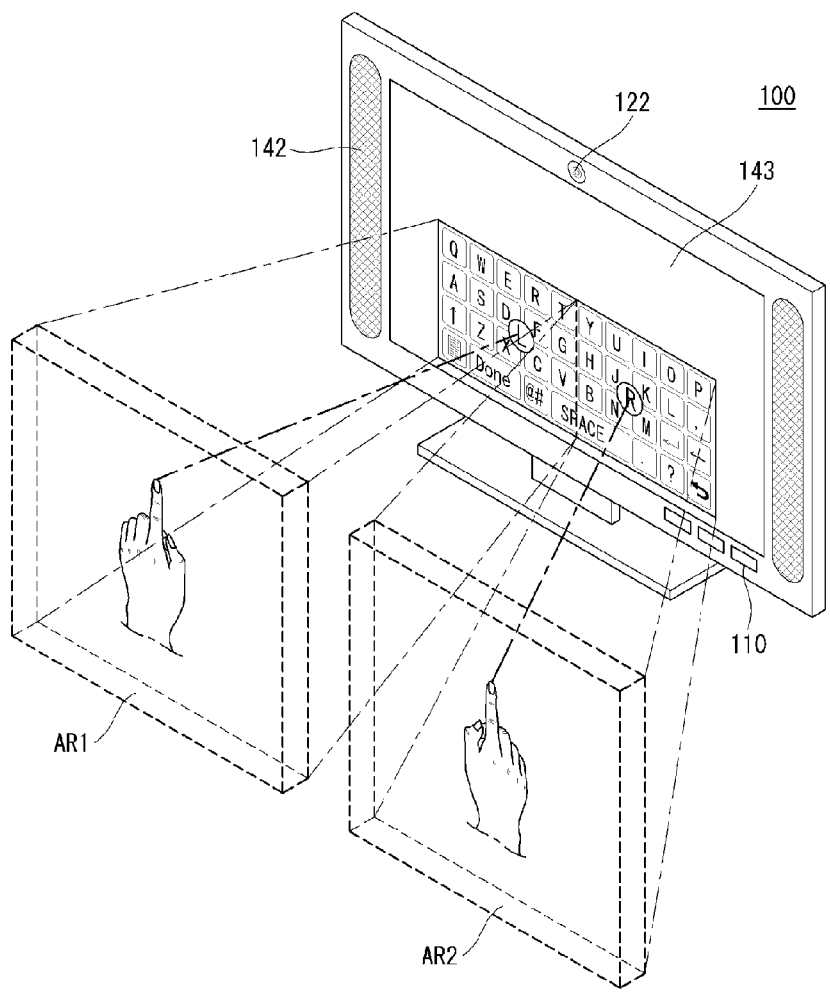
FIG. 33 is a diagram relating to a first indicator and a second indicator according to the double-hand typing mode in the gesture-based key input method according to the third embodiment of the present invention.

The electronic device 100 may display an indicator, reflecting the position of the hand, according to the selected typing mode at step S350. This step is described with reference to FIGS. 31, 32, and 33. FIG. 31 is a diagram relating to indicators according to a typing mode in the gesture-based key input method according to the third embodiment of the present invention, FIG. 32 is a diagram relating to indicators according to the double-hand typing mode in the gesture-based key input method according to the third embodiment of the present invention, and FIG. 33 is a diagram relating to a first indicator and a second indicator according to the double-hand typing mode in the gesture-based key input method according to the third embodiment of the present invention.

The controller 170 may display an indicator, reflecting a position of the hand or a position of a finger, according to a selected typing mode. The controller 170 may display the indicator at coordinates, corresponding to the position of the hand or the position of the finger within an input region, on a virtual region.

As shown in FIG. 31, when the single-hand typing mode is entered, the controller 170 may display one indicator reflecting a position of one hand. When the double-hand typing mode is entered, the controller 170 may display two indicators reflecting respective positions of both hands. Meanwhile, when typing is performed using a plurality of fingers for every hand, the controller 170 may display a plurality of indicators reflecting respective positions of the fingers.

The controller 170 may differently display the shape of an indicator displayed in the single-hand typing mode and the shape of an indicator displayed in the double-hand typing mode.

Furthermore, when the double-hand typing mode is selected, the controller 170 may differently display the shape of a first indicator reflecting the position of a first hand and the shape of a second indicator reflecting the position of a second hand, as shown in FIG. 32.

Furthermore, in the case where an input region is implemented using a first input region and a second input region which are spatially separated from each other in the double-hand typing mode, the controller 170 may display a first indicator, reflecting the position of a first hand performing gesture for the first input region, in a first part of a virtual keyboard corresponding to the first input region and a second indicator, reflecting the position of a second hand performing gesture for the second input region, in a second part of the virtual keyboard corresponding to the second input region. Here, even when the first hand moves from the first input region to the second input region, the controller 170 may not display the first indicator in the second part. In this case, the controller 170 may display the first indicator at coordinates where the first hand is finally placed, from the first part, or may not display the first indicator.

Meanwhile, the indicator needs not to be displayed at coordinates corresponding to a position of the end of a finger within an input region on a virtual keyboard. For example, the controller 170 may display the indicator at the center of a specific key, corresponding to the position of the end of the finger, or in the entire region of the specific key.

In accordance with the gesture-based key input method according to the third embodiment of the present invention, when a key input is performed through gesture for an input region corresponding to a virtual keyboard, an indicator reflecting a position of the hand of a user can be appropriately displayed according to a typing method of performing input through the gesture. Accordingly, a user can check the position of the hand.

Accordingly, a user can gesture more accurately because the electronic device 100 provides guidance to the user so that the user can gesture for an input region.

Hereinafter, the gesture-based key input method according to the fourth embodiment of the present invention is described with reference to FIG. 34. FIG. 34 is a flowchart illustrating the gesture-based key input method according to the fourth embodiment of the present invention.

The gesture-based key input method according to the fourth embodiment of the present invention, as shown in FIG. 35, may comprise at least one of selecting a typing mode at step S410, controlling the display of a virtual keyboard according to a selected typing mode at step S420, obtaining an image at step S430, recognizing gesture for an input region corresponding to the virtual keyboard by analyzing the image at step S440, and obtaining a key input based on the gesture at step S450.

Each of the steps of the gesture-based key input method according to the fourth embodiment of the present invention is described below.

Here, selecting the typing mode at step S410, obtaining the image at step S430, recognizing gesture for an input region corresponding to the virtual keyboard by analyzing the image at step S440, and obtaining a key input based on the gesture at step S450 may be the same as or similar to those of the gesture-based key input methods according to the first, second, and third embodiments of the present invention, and thus a description of them is omitted for simplicity.

Figure 37:
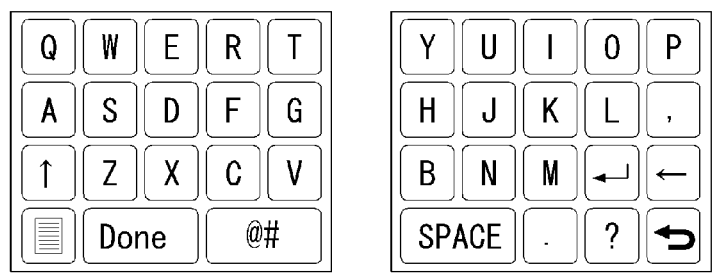
FIG. 37 is a third diagram relating to the layout of a virtual keyboard in the gesture-based key input method according to the fourth embodiment of the present invention.

The electronic device 100 may control the display of a virtual keyboard in the selected typing mode at step S420. This step is described with reference to FIGS. 35, 36, and 37. FIG. 35 is a first diagram relating to the layout of a virtual keyboard in the gesture-based key input method according to the fourth embodiment of the present invention, FIG. 36 is a second diagram relating to the layout of a virtual keyboard in the gesture-based key input method according to the fourth embodiment of the present invention, and FIG. 37 is a third diagram relating to the layout of a virtual keyboard in the gesture-based key input method according to the fourth embodiment of the present invention.

The controller 170 may control the display of the virtual keyboard according to the selected typing mode. Here, the controller 170 may display the virtual keyboard in various layouts. For example, the layout of the virtual keyboard may be a layout, such as a QWERTY keyboard, as shown in FIG. 35. For another example, the layout of the virtual keyboard may be a layout, such as a 3×4 keyboard or a 3×3 keyboard, as shown in FIG. 36. For yet another example, the layout of the virtual keyboard may be a layout, such as a virtual keyboard implemented using a first part and a second part spatially separated from each other, as shown in FIG. 37.

The controller 170 may change the layout of the virtual keyboard according to the selected typing mode. For example, when the single-hand typing mode is selected, the controller 170 may display the virtual keyboard of a first layout. When the double-hand typing mode is selected, the controller 170 may display the virtual keyboard of a second layout. Here, the virtual keyboard of the first layout may have a less number of keys than the virtual keyboard of the second layout. More particularly, the controller 170 may display the 3×4 keyboard of FIG. 36 in the single-hand typing mode and may display the QWERTY keyboard of FIG. 35 in the double-hand typing mode. In some embodiments, the controller 170 may display the QWERTY keyboard of FIG. 35 in the single-hand typing mode and may display the QWERTY keyboard of FIG. 37 separated into a first part and a second part in the double-hand typing mode.

In some embodiments, the controller 170 may change the size of the virtual keyboard according to the selected typing mode. For example, the controller 170 may display the virtual keyboard of a first size in the single-hand typing mode and may display the virtual keyboard of a second size in the double-hand typing mode. Here, the first size and the second size may be different from each other. More particularly, the second size may be greater than the first size. Furthermore, the second size and the first size may have the same length in the y axis, and the second size may be greater than the first size in the x axis.

Meanwhile, the controller 170 may inform a change of a typing mode between the double-hand typing mode and the single-hand typing mode through output. For example, the controller 170 may output a voice alarm signal.

In accordance with the gesture-based key input method according to the fourth embodiment of the present invention, a user can perform a key input more conveniently because the display of a virtual keyboard is properly changed according to a typing method of performing input through gesture.

In the gesture-based key input methods according to the present invention, the steps constituting each embodiment are not indispensable, but may be selectively included in each embodiment. The steps constituting each embodiment need not to be performed in the described order, and a step described later may be performed earlier than a step described first.

Furthermore, in the gesture-based key input methods according to the present invention, the embodiments may be implemented individually or in combination. The steps constituting each embodiment may be implemented individually or in combination with steps constituting other embodiments.

Furthermore, the gesture-based key input method according to each of the embodiments of the present invention may be stored in a computer-readable recording medium in the form of codes or a program for performing the method.

Those having ordinary skill in the art to which the present invention pertains may change and modify the present invention in various ways without departing from the technical spirit of the present invention. Accordingly, the present invention is not limited to the above-described embodiments and the accompanying drawings. Further, the embodiments described in the present invention should not be construed to be limitative from all aspects, and some of or all the embodiments may be selectively combined in various ways.

INDUSTRIAL APPLICABILITY

According to the present invention, a method and electronic device for gesture-based key input provide a proper input region for a gesture-based key input by determining a user's intention of a single-hand typing or a double-hand typing based on a state of hands, so that the user types a key input by a gesture easily.

The invention claimed is:

1. An electronic device for gesture-based key input, comprising:
    a camera;
    a display configured to display a virtual keyboard; and
    a controller configured to:
        set a three-dimensional (3-D) input region, corresponding to the displayed virtual keyboard, according to a typing mode selected from among a single-hand typing mode and a double-hand typing mode, recognize a gesture for the 3-D input region, detected through the camera, and obtain a key input according to the recognized gesture,
    wherein the controller controls an attribute of the 3-D input region according to the selected typing mode,
    wherein the attribute of the 3-D input region comprises a size of the 3-D input region, a position of the 3-D input region, and a moving distance on the virtual keyboard according to a movement of the hand in the 3-D input region, and
    wherein the controller sets the moving distance on the virtual keyboard according to the movement of the hand in the 3-D input region so that the moving distance is smaller when the double-hand typing mode is selected than when the single-hand typing mode is selected.

2. The electronic device of claim 1, wherein the controller obtains information about a state of a hand by analyzing an image obtained through the camera and selects the typing mode based on the information about the state of the hand.

3. The electronic device of claim 2, wherein:
    the information about the state of the hand comprises information about a position of the hand, and
    the controller selects the single-hand typing mode when the number of hands placed within a predetermined region is one and selects the double-hand typing mode when the number of hands placed within the predetermined region is two.

4. The electronic device of claim 2, wherein:
    the information about the state of the hand comprises information about a position of the hand, and
    the controller selects the single-hand typing mode when a distance between a first hand and a second hand is greater than a predetermined distance and selects the double-hand typing mode when the distance between the first hand and the second hand is smaller than the predetermined distance.

5. The electronic device of claim 2, wherein:
    the information about the state of the hand comprises information about a shape of the hand, and
    the controller selects the single-hand typing mode when the number of hands assuming a predetermined shape is one and selects the double-hand typing mode when the number of hands assuming the predetermined shape is two.

6. The electronic device of claim 1, wherein the controller recognizes the gesture by analyzing an image obtained through the camera and selects the typing mode based on the gesture.

7. The electronic device of claim 6, wherein the controller selects the single-hand typing mode when the number of hands performing a predetermined gesture is one and selects the double-hand typing mode when the number of hands performing the predetermined gesture is two.

8. The electronic device of claim 1, wherein when the double-hand typing mode is selected, the controller controls an attribute of the 3-D input region by further considering at least one of a distance between a first hand and a second hand, calculated by analyzing an image obtained through the camera, and shapes of the first hand and the second hand.

9. The electronic device of claim 1, wherein when the double-hand typing mode is selected, the controller sets the 3-D input region so that the 3-D input region comprises a first input region and a second input region spatially separated from each other and senses a gesture for the first input region performed by a first hand and a gesture for the second input region performed by a second hand.

10. The electronic device of claim 1, wherein the controller sets the 3-D input region larger when the double-hand typing mode than when the single-hand typing mode is selected.

11. The electronic device of claim 1, wherein the controller sets the 3-D input region based on a position of a first hand when the single-hand typing mode is selected and sets the 3-D input region based on the position of the first hand and a position of a second hand when the double-hand typing mode is selected.

12. The electronic device of claim 1, wherein the controller controls an attribute of the 3-D input region by further considering a distance up to a user.

13. The electronic device of claim 1, wherein the virtual keyboard comprises a QWERTY keyboard.

14. An electronic device for gesture-based key input, comprising:
    a camera;
    a display configured to display a virtual keyboard; and
    a controller configured to:
        when a typing mode selected from among a single-hand typing mode and a double-hand typing mode is entered, recognize a gesture for an input region on a 3-D space corresponding to the displayed virtual keyboard by analyzing an image obtained through the camera and obtain a key input based on the recognized gesture,
        when the single-hand typing mode is entered, obtain the key input by recognizing only gesture performed by a first hand from the image, and when the double-hand typing mode is entered, obtain the key input by recognizing a gesture performed by at least one of the first hand and a second hand from the image, wherein:
    the controller senses a position of a hand within the input region through the camera and displays an indicator at coordinates corresponding to the position of the hand on the virtual keyboard, and
    the controller displays one indicator, reflecting a position of one hand, when the single-hand typing mode is entered and displays two indicators, reflecting respective positions of both hands, when the double-hand typing mode is entered,
    when the double-hand typing mode is selected, the input region comprises a first input region and a second input region spatially separated from each other, and
    the controller displays a first indicator reflecting a position of the first hand, from among the two indicators, on a virtual keyboard corresponding to the first input region and displays a second indicator reflecting a position of the second hand, from among the two indicators, on the virtual keyboard corresponding to the second input region.

15. The electronic device of claim 14, wherein the controller differently displays the one indicator and the two indicators.

16. The electronic device of claim 14, wherein the two indicators reflecting the respective positions of both hands are differently displayed.

17. An electronic device for gesture-based key input, comprising:
a camera;
a display configured to display a virtual keyboard; and
a controller configured to: control a display of the virtual keyboard according to a typing mode selected from among a single-hand typing mode and a double-hand typing mode,
recognize a gesture for an input region on a 3-D space corresponding to the virtual keyboard by analyzing an image obtained through the camera, and
obtain a key input based on the recognized gesture, wherein:
the controller displays a first virtual keyboard when the single-hand typing mode is selected and displays a second virtual keyboard when the double-hand typing mode is selected, and
the number of keys of the second virtual keyboard is larger than the number of keys of the first virtual keyboard,
the first virtual keyboard comprises any one of a 3×3 keyboard and a 3×4 keyboard, and the second virtual keyboard comprises a QWERTY keyboard.

18. The electronic device of claim 17, wherein the controller displays the virtual keyboard larger when the double-hand typing mode is selected than when the single-hand typing mode is selected.

19. A method for gesture-based key input, comprising:
displaying a virtual keyboard;
setting an input region on a 3-D space by a controller, corresponding to the displayed virtual keyboard, according to a typing mode selected from among a single-hand typing mode and a double-hand typing mode;
recognizing a gesture for the input region; and obtaining a key input based on the recognized gesture,
wherein the controller controls an attribute of the 3-D input region according to the selected typing mode,
wherein the attribute of the 3-D input region comprises a size of the 3-D input region, a position of the 3-D input region, and a moving distance on the virtual keyboard according to a movement of the hand in the 3-D input region, and
wherein the controller sets the moving distance on the virtual keyboard according to the movement of the hand in the 3-D input region so that the moving distance is smaller when the double-hand typing mode is selected than when the single-hand typing mode is selected.

20. The method of claim 19, further comprising:
obtaining an image and obtaining information about a state of a hand by analyzing the image; and
selecting the typing mode based on the information about the state of the hand.

21. A method for gesture-based key input, comprising:
displaying a virtual keyboard, wherein a controller controls the displaying of the virtual keyboard;
when a typing mode selected from among a single-hand typing mode and a double-hand typing mode is entered, obtaining an image and recognizing a gesture for an input region on a 3-D space corresponding to the displayed virtual keyboard by analyzing the image; and
obtaining a key input based on the recognized gesture,
wherein recognizing the gesture comprises:
when the single-hand typing mode is entered, recognizing only gesture performed by a first hand from the image, and
when the double-hand typing mode is entered, recognizing a gesture performed by at least one of the first hand and a second hand from the image,
wherein the controller controls an attribute of the 3-D input region according to the selected typing mode,
wherein the attribute of the 3-D input region comprises a size of the 3-D input region, a position of the 3-D input region, and a moving distance on the virtual keyboard according to a movement of the hand in the 3-D input region, and
wherein the controller sets the moving distance on the virtual keyboard according to the movement of the hand in the 3-D input region so that the moving distance is smaller when the double-hand typing mode is selected than when the single-hand typing mode is selected.

22. A method for gesture-based key input, comprising:
displaying a virtual keyboard;
controlling a display of the virtual keyboard by a controller according to a typing mode selected from among a single-hand typing mode and a double-hand typing mode;
recognizing a gesture for an input region on a 3-D space corresponding to the virtual keyboard; and
obtaining a key input based on the recognized gesture,
wherein the controller controls an attribute of the 3-D input region according to the selected typing mode,
wherein the attribute of the 3-D input region comprises a size of the 3-D input region, a position of the 3-D input region, and a moving distance on the virtual keyboard according to a movement of the hand in the 3-D input region, and
wherein the controller sets the moving distance on the virtual keyboard according to the movement of the hand in the 3-D input region so that the moving distance is smaller when the double-hand typing mode is selected than when the single-hand typing mode is selected.

* * * * *